United States Patent
Zhong et al.

(10) Patent No.: US 11,265,054 B2
(45) Date of Patent: Mar. 1, 2022

(54) BEAMFORMING METHOD AND DEVICE

(71) Applicant: HUAWEI TECHNOLOGIES CO., LTD., Guangdong (CN)

(72) Inventors: Zhimeng Zhong, Shanghai (CN); Di Feng, Shenzhen (CN); Xiaomei Zhang, Shanghai (CN); Jingfeng Qu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 60 days.

(21) Appl. No.: 16/742,366

(22) Filed: Jan. 14, 2020

(65) Prior Publication Data
US 2020/0153493 A1    May 14, 2020

Related U.S. Application Data

(63) Continuation of application No. PCT/CN2017/093052, filed on Jul. 14, 2017.

(51) Int. Cl.
*H04B 7/06* (2006.01)
*H04B 7/0456* (2017.01)
(Continued)

(52) U.S. Cl.
CPC ......... *H04B 7/0617* (2013.01); *H04B 7/0469* (2013.01); *H04B 7/086* (2013.01); *H04L 25/022* (2013.01)

(58) Field of Classification Search
CPC .... H04B 7/0469; H04B 7/086; H04B 7/0617; H04L 257/022
See application file for complete search history.

(56) References Cited

U.S. PATENT DOCUMENTS 6,266,633 B1 * 7/2001 Higgins ............. G10L 21/0208
                                                    704/224
8,767,861 B2 * 7/2014 Xiao .................... H04B 7/0626
                                                    375/267
(Continued)

FOREIGN PATENT DOCUMENTS

CN    101364828 A      2/2009
CN    101465683 A  *  6/2009  ............ H04W 52/16
(Continued)

OTHER PUBLICATIONS

Chalise et al., "Robust Uplink to Downlink Spatial Covariance Matrix Transformation for Downlink Beamforming.", IEEE International Conference on Communications. 2004, vol. 5, Jun. 2004 (Year: 2004).*

(Continued)

*Primary Examiner* — Berhanu Tadese
(74) *Attorney, Agent, or Firm* — Fish & Richardson P.C.

(57) ABSTRACT

The present disclosure relates to beamforming methods and devices. In one example method, an access network device calculates an uplink channel frequency response, calculates a model parameter in a channel frequency response mathematical model based on the uplink channel frequency response and each uplink subcarrier frequency, where the model parameter has reciprocity on uplink and downlink subcarrier frequencies, constructs a downlink channel frequency response based on the model parameter, the channel frequency response mathematical model, and each downlink subcarrier frequency, calculates a beamforming weight for each downlink subcarrier frequency based on the downlink channel frequency response, and performs downlink beamforming on an antenna array based on the beamforming weight for each downlink subcarrier frequency, where the (Continued)

antenna array is a dual-polarized antenna array or a single-polarized antenna array.

27 Claims, 6 Drawing Sheets

(51) Int. Cl.
*H04B 7/08* (2006.01)
*H04L 25/02* (2006.01)

(56) References Cited

U.S. PATENT DOCUMENTS

| | | | |
|---|---|---|---|
| 9,425,870 B2* | 8/2016 | Lorca Hernando .. | H04B 7/0617 |
| 2004/0095907 A1* | 5/2004 | Agee .................... | H04B 7/0417 370/334 |
| 2006/0270416 A1* | 11/2006 | Perets .................... | H04L 5/023 455/452.2 |
| 2008/0076477 A1 | 3/2008 | Hedayat et al. | |
| 2008/0192811 A1* | 8/2008 | Son ....................... | H04B 7/0641 375/219 |
| 2009/0067375 A1* | 3/2009 | Wong .................... | H04B 7/0632 370/329 |
| 2010/0020702 A1* | 1/2010 | Wong .................... | H04W 72/082 370/252 |
| 2010/0232348 A1* | 9/2010 | Wu ....................... | H04L 27/34 370/315 |
| 2010/0238846 A1* | 9/2010 | Xu ........................ | H04B 7/0617 370/280 |
| 2012/0027111 A1* | 2/2012 | Vook .................... | H04B 7/0452 375/267 |
| 2012/0302172 A1* | 11/2012 | Falconetti ............. | H04L 1/0001 455/67.11 |
| 2013/0045698 A1* | 2/2013 | Dale .................... | H04W 52/16 455/98 |
| 2014/0129625 A1* | 5/2014 | Haugen ................. | G06Q 50/01 709/204 |
| 2014/0177683 A1* | 6/2014 | Krishnamurthy ...... | H04B 7/065 375/219 |
| 2014/0177744 A1* | 6/2014 | Krishnamurthy .... | H04B 7/0469 375/267 |
| 2014/0177745 A1* | 6/2014 | Krishnamurthy .... | H04B 7/0413 375/267 |
| 2014/0307594 A1* | 10/2014 | Marzetta ............... | H04W 16/32 370/280 |
| 2015/0280797 A1* | 10/2015 | Li ......................... | H04B 17/21 370/280 |
| 2015/0326341 A1* | 11/2015 | Lorca Hernando ... | H04L 5/0044 370/328 |
| 2016/0204822 A1* | 7/2016 | Yu ........................ | H04B 1/40 375/219 |
| 2016/0227298 A1* | 8/2016 | White .................. | H04Q 9/04 |
| 2016/0359546 A1* | 12/2016 | Bennett ................. | H04L 5/14 |
| 2016/0359547 A1* | 12/2016 | Bennett ............. | H04B 7/15507 |
| 2016/0360533 A1* | 12/2016 | Bennett ................. | H04B 7/022 |
| 2016/0365966 A1* | 12/2016 | Bennett ................. | H04L 5/0048 |
| 2017/0012667 A1* | 1/2017 | Bennett .................. | H04B 3/52 |
| 2017/0019154 A1 | 1/2017 | Reed | |
| 2017/0077998 A1* | 3/2017 | Gerszberg ............. | H04L 5/003 |
| 2017/0078064 A1* | 3/2017 | Gerszberg ................ | H04B 3/52 |
| 2017/0079037 A1* | 3/2017 | Gerszberg ............. | H04L 5/0048 |
| 2017/0079038 A1* | 3/2017 | Gerszberg ............. | H04L 7/0008 |
| 2017/0079039 A1* | 3/2017 | Gerszberg ........... | H04W 72/042 |
| 2020/0153493 A1* | 5/2020 | Zhong .................. | H04B 7/0617 |

FOREIGN PATENT DOCUMENTS

| | | | | |
|---|---|---|---|---|
| CN | 101626265 A | | 1/2010 | |
| CN | 102045097 A | | 5/2011 | |
| CN | 102547953 A | | 7/2012 | |
| CN | 101465683 B | * | 10/2012 | ............... H04B 7/10 |
| CN | 103905345 A | | 7/2014 | |
| CN | 203775416 U | * | 8/2014 | .......... H04B 7/0469 |
| CN | 104052691 A | | 9/2014 | |
| CN | 110870216 A | * | 3/2020 | .......... H04L 25/022 |
| EP | 3185440 A1 | | 6/2017 | |
| EP | 3648364 A1 | * | 5/2020 | ............. H04B 7/086 |
| EP | 3648364 A4 | * | 6/2020 | .......... H04L 25/022 |
| KR | 20140129625 A | | 11/2014 | |
| KR | 20160121312 A | * | 10/2016 | ............... H04B 7/10 |
| KR | 20160121312 A | | 10/2016 | |
| KR | 20200026983 A | * | 3/2020 | .......... H04B 7/0469 |
| WO | 2011091586 A1 | | 8/2011 | |
| WO | WO-2011091586 A1 | * | 8/2011 | .......... H04B 7/0469 |
| WO | WO-2013063424 A1 | * | 5/2013 | ............. H04W 52/16 |
| WO | 2014101170 A1 | | 7/2014 | |
| WO | WO-2014101170 A1 | * | 7/2014 | .......... H04B 7/0626 |
| WO | 2017025116 A1 | | 2/2017 | |
| WO | WO-2017025116 A | * | 2/2017 | ............... H04B 7/10 |
| WO | 2017083000 A1 | | 5/2017 | |
| WO | WO-2019010714 A1 | * | 1/2019 | .......... H04B 7/0469 |

OTHER PUBLICATIONS

3GPP TS 36.211 V14.3.0 (Jun. 2017), "3rd Generation Partnership Project; Technical Specification Group Radio Access Network; Evolved Universal Terrestrial Radio Access (E-UTRA); Physical channels and modulation (Release 14)," Jun. 2017, 196 pages.
Extended European Search Report issued in European Application No. 17917246.5 dated May 11, 2020, 7 pages.
PCT International Search Report and Written Opinion issued in International Application No. PCT/CN2017/093052 dated Mar. 29, 2018, 20 pages (with English translation).
Office Action issued in Chinese Application No. 201780092878.4 dated Oct. 10, 2020, 10 pages.
Ruonan Zhang et al, "Channel Measurement and Packet-Level Modeling for V2I Spatial Multiplexing Uplinks," IEEE Transactions on Vehicular Technology, vol. 65, No. 10, Oct. 2016, 13 pages.
Sahar Imtiaz et al, "On the directional reciprocity of uplink and downlink channels in Frequency Division Duplex systems," 2014 IEEE 25th Annual International Symposium on Personal, Indoor, and Mobile Radio Communication (PIMRC), Jun. 29, 2015, 5 pages.
Zhimeng Zhong et al, "Measurement and modeling of 3-dimensional radio channels with cross-polarizations in a gymnasium," 2017 11th European Conference on Antennas and Propagation (EUCAP), May 18, 2017, 5 pages.
Office Action issued in Korean Application No. 2020-7003842 dated Jun. 5, 2021, 4 pages (with English translation).

* cited by examiner

BEAMFORMING METHOD AND DEVICE

CROSS-REFERENCE TO RELATED APPLICATIONS

This application is a continuation of International Application No. PCT/CN2017/093052, filed on Jul. 14, 2017, the disclosure of which is hereby incorporated by reference in its entirety.

TECHNICAL FIELD

Embodiments of this application relate to the field of communications technologies, and in particular, to a beamforming method and a device.

BACKGROUND

As a new generation mobile communications key technology, a massive multiple-input multiple-output (Massive MIMO) technology can provide greater spatial freedom. With the massive MIMO beamforming technology, a directivity pattern of a transmit/receive antenna can be automatically adjusted, to obtain better coverage and capacity performance.

An existing beamforming solution is as follows: A beamforming weight is constructed based on a precoding matrix indicator (PMI) reported by a terminal, to perform beamforming based on the beamforming weight. Specifically, corresponding codebook sets are configured in the terminal for different antenna arrays. These codebook sets include candidate weights $\{w_m\}$, a base station and the terminal share these codebook sets, $m=1, 2, \ldots, M$, and M represents a total quantity of all codebooks in the codebook sets. The terminal calculates a frequency response $h_{DL}$ of a downlink channel based on a received signal, and calculates, for the channel, beamforming signal to noise ratios (SNR)/receive power gains that may be obtained when an antenna array of the base station is weighted based on all the candidate weights $w_m$. Then the terminal selects m that achieves a largest SNR/receive power gain as the PMI and reports the PMI to the base station. The base station selects, based on the PMI, a corresponding candidate weight in a same codebook set, and weights the antenna array for beamforming.

In the prior-art solution, the terminal needs to feed back the PMI to the base station after obtaining $h_{DL}$, so that a beamforming weight is determined for beamforming. Such a feedback mechanism reduces beamforming timeliness. In this case, when the base station waits for the feedback of the terminal before beamforming, the channel may change due to a factor such as an environmental change or terminal movement. If the base station performs beamforming by still using the PMI that is reported before the channel changes, an error is relatively large.

SUMMARY

Embodiments of this application provide a beamforming method and a device, so that a terminal does not need to perform feedback when a beamforming weight of an antenna array is configured, and beamforming timeliness can be improved.

To achieve the foregoing objective, the following technical solutions are used in the embodiments of this application:

According to a first aspect, a beamforming method is provided, including: First, an access network device calculates an uplink channel frequency response; then, the access network device calculates a model parameter in a channel frequency response mathematical model based on the uplink channel frequency response and each uplink subcarrier frequency, where the model parameter has reciprocity on uplink and downlink subcarrier frequencies; next, the access network device constructs a downlink channel frequency response based on the model parameter, the channel frequency response mathematical model, and each downlink subcarrier frequency; after that, the access network device calculates a beamforming weight of each downlink subcarrier frequency based on the downlink channel frequency response; and finally, the access network device performs downlink beamforming on an antenna array based on the weight, where the antenna array is a dual-polarized antenna array or a single-polarized antenna array.

In this way, the access network device can directly construct the downlink channel frequency response based on the uplink channel frequency response and the channel frequency response mathematical model, and calculate the beamforming weight based on the downlink channel frequency response, to perform beamforming. Therefore, when the beamforming weight is calculated, a terminal does not need to perform feedback as in the prior art, thereby improving beamforming timeliness, and reducing an error caused by relatively poor timeliness.

With reference to the first aspect, in a possible implementation, the model parameter includes a distance of each path, an angle of arrival of each path, an amplitude of each path, and an initial phase of each path.

In other words, independent variables in the channel frequency response mathematical model may include a distance of each path, an angle of arrival of each path, an amplitude of each path, and an initial phase of each path.

With reference to the first aspect and the foregoing possible implementation, in another possible implementation, that the access network device calculates a model parameter in a channel frequency response mathematical model based on the uplink channel frequency response and each uplink subcarrier frequency includes: First, the access network device constructs a target likelihood spectrum of the uplink channel frequency response based on the uplink channel frequency response and each uplink subcarrier frequency; then, the access network device calculates a target value of each path and a target value of the angle of arrival of each path based on the target likelihood spectrum; and finally, the access network device calculates a target value of the amplitude of each path and a target value of the initial phase of each path based on the target value of the distance of each path and the target value of the angle of arrival of each path.

Such a method for constructing the target likelihood spectrum and searching the target likelihood spectrum for a peak to obtain the model parameter is relatively simple.

With reference to the first aspect and the foregoing possible implementations, in another possible implementation, the target likelihood spectrum is a spatial spectrum formed through coherent accumulation after conjugate compensation for a steering vector of the uplink channel frequency response.

In this way, a true value can be highlighted on the target likelihood spectrum as a peak, so that the model parameter is more quickly and accurately solved by searching for a spectrum peak.

With reference to the first aspect and the foregoing possible implementations, in another possible implementation, that the access network device calculates a target value of each path and a target value of the angle of arrival of each path based on the target likelihood spectrum includes: The access network device calculates an initial value of the distance of each path and an initial value of the angle of arrival of each path based on the target likelihood spectrum; and the access network device calculates the target value of the distance of each path and the target value of the angle of arrival of each path based on the initial value of the distance of each path and the initial value of the angle of arrival of each path by using an optimization algorithm.

In other words, the access network device can simply and quickly obtain an initial value of a model parameter by searching the target likelihood spectrum for a peak, and then accurately solve a target value of each model parameter by using the optimization algorithm.

With reference to the first aspect and the foregoing possible implementations, in another possible implementation, that the access network device calculates a target value of each path and a target value of the angle of arrival of each path based on the target likelihood spectrum includes: The access network device calculates an initial value of the distance of each path and an initial value of the angle of arrival of each path based on the target likelihood spectrum; and the access network device calculates the target value of the distance of each path and the target value of the angle of arrival of each path based on the target likelihood spectrum, the initial value of the distance of each path, and the initial value of the angle of arrival of each path by using a search algorithm.

In other words, the access network device solves an initial value and a target value of each model parameter by searching the target likelihood spectrum for a peak. Such a manner is relatively simple.

With reference to the first aspect and the foregoing possible implementations, in another possible implementation, the access network device solves a target value of each model parameter based on the uplink channel frequency response by using an optimization algorithm.

In this way, the access network device directly solves the model parameter in entire parameter space, and this is more accurate.

With reference to the first aspect and the foregoing possible implementations, in another possible implementation, the channel frequency response mathematical model does not include directivity pattern information.

In this way, when a downlink channel frequency response mathematical model is constructed based on the channel frequency response mathematical model, domain transformation does not need to be performed on the channel frequency response mathematical model at the beginning, so that calculation complexity is low, and a construction process is simpler.

With reference to the first aspect and the foregoing possible implementations, in another possible implementation, the channel frequency response mathematical model is expressed as follows:

$$F(k, i) = \sum_{n=1}^{N} a_n e^{j\phi_n} e^{-j\frac{2\pi}{\lambda_i} d_n} e^{-j\frac{2\pi}{\lambda_i} kl\cos\theta_n},$$

where $F(k,i)$ represents the channel frequency response mathematical model, $n=1, 2, \ldots, N$ represents a number of a path, $N$ represents a quantity of paths, $d_n$ represents a distance of an $n^{th}$ path, $\theta_n$ represents an angle of arrival of the $n^{th}$ path, $a_n$ represents an amplitude of the $n^{th}$ path. $\phi_n$ represents an initial phase of the $n^{th}$ path. $\lambda_i$ represents a wavelength corresponding to an $i^{th}$ subcarrier frequency, $i=1, 2, \ldots, I$ represents a number of a subcarrier frequency, $I$ represents a quantity of subcarrier frequencies, $k=1, 2, \ldots, K$ represents a number of an array element. $K$ represents a quantity of array elements, and $l$ represents an array element spacing.

In this way, the expression provides a specific form of a simple channel frequency response mathematical model.

With reference to the first aspect and the foregoing possible implementations, in another possible implementation, the target likelihood spectrum of the uplink channel frequency response is expressed as follows:

$$\Theta(d, \theta) = \left\| \sum_{i=1}^{I} \sum_{k=1}^{K} h_{UL}(k, i) e^{j\frac{2\pi}{\lambda_{UL,i}} d} e^{j\frac{2\pi}{\lambda_{UL,i}} kl\cos\theta} \right\|_2^2,$$

where $\Theta(d,\theta)$ represents the target likelihood spectrum, $h_{UL}(k,i)$ represents the uplink channel frequency response, $d$ represents a distance of a path, $\theta$ represents an angle of arrival of a path, $\lambda_{UL,i}$ represents a wavelength corresponding to an $i_{th}$ uplink subcarrier frequency, $I=1, 2, \ldots, I$ represents the number of a subcarrier frequency, $I$ represents the quantity of subcarrier frequencies, $k=1, 2, \ldots, K$ represents the number of an array element, $K$ represents a quantity of array elements, $l$ represents the array element spacing, and $\|\ \|_2$ represents a Euclidean norm.

In this way, the expression provides a specific form of the target likelihood spectrum obtained through conjugate compensation and coherent accumulation.

With reference to the first aspect and the foregoing possible implementations, in another possible implementation, when the antenna array is a planar array, the channel frequency response mathematical model is expressed as follows:

$$F(k_H, k_V, i) = \sum_{n=1}^{N} a_n e^{j\phi_n} e^{-j\frac{2\pi}{\lambda_i} d_n} e^{-j\frac{2\pi}{\lambda_i} k_V l \cos\gamma_n} e^{-j\frac{2\pi}{\lambda_i} k_H l \cos\varphi_n \sin\gamma_n},$$

where $F(k_H,k_V,i)$ represents the channel frequency response mathematical model, $n=1, 2, \ldots, N$ represents a number of a path, $N$ represents a quantity of paths, $d_n$ represents a distance of an $n^{th}$ path, $\theta_n$ represents an angle of arrival of the $n^{th}$ path, $a_n$ represents an amplitude of the $n^{th}$ path, $\phi_n$ represents an initial phase of the $n^{th}$ path, $\lambda_i$ represents a wavelength corresponding to an $i^{th}$ subcarrier frequency, $i=1, 2, \ldots, I$ represents a number of a subcarrier frequency, $I$ represents a quantity of subcarrier frequencies, $k=1, 2, \ldots, K$ represents a number of an array element, $K$ represents a quantity of array elements, $l$ represents an array element spacing, $k_H$ represents a quantity of rows of the antenna array, $k_V$ represents a quantity of columns of the antenna array, $\varphi_n$ represents a horizontal angle of the $n^{th}$ path, and $\gamma_n$ represents a pitch angle of the $n^{th}$ path.

In this way, the expression provides a specific form of the channel frequency response mathematical model for the planar array.

With reference to the first aspect and the foregoing possible implementations, in another possible implementation, when the antenna array is the dual-polarized antenna array, the uplink channel frequency response includes a first polarization uplink channel frequency response and a second polarization uplink channel frequency response, the model parameter includes a first polarization model parameter and a second polarization model parameter, and the model parameter conforms to the following expression:

$$\begin{cases} \{\text{model parameter}\} = \underset{\{\text{model parameter}\}}{\arg\min} \; \|F_{UL}^+(k, i) - h_{UL}^+(k, i)\|_2^2 + \|F_{UL}^-(k, i) - h_{UL}^-(k, i)\|_2^2 \\ F_{UL}^+(k, i \mid \lambda, \text{model parameter}) = F(k, i \mid \lambda_{UL}, \text{first polarization model parameter}) \\ F_{UL}^-(k, i \mid \lambda, \text{model parameter}) = F(k, i \mid \lambda_{UL}, \text{second polarization model parameter}) \end{cases},$$

where arg min represents a variable when an objective function is solved to obtain a minimum value, i represents the number of a subcarrier frequency, k represents the number of an array element, $\lambda$ represents a wavelength corresponding to a subcarrier frequency, $\lambda_{UL}$ represents a wavelength corresponding to an uplink subcarrier frequency, $F_{UL}^+$ represents a first polarization uplink channel frequency response mathematical model, $F_{UL}^-$ represents a second polarization uplink channel frequency response mathematical model, F represents the channel frequency response mathematical model, $h_{UL}^+$ represents the first polarization uplink channel frequency response, $h_{UL}^-$ represents the second polarization uplink channel frequency response, and $\| \; \|_2$ represents a Euclidean norm.

In this way, in a dual-polarized antenna array scenario, the access network device may add up dual-polarization optimization objective functions, to jointly solve the model parameter based on dual-polarization information, so that peaks formed on the optimization objective functions by a plurality of true paths can be more highlighted, and pseudo peaks formed on the optimization objective functions by interference such as noise are relatively suppressed, thereby reducing a quantity of iterations, and helping more efficiently and accurately determine the model parameter in the dual-polarization scenario.

With reference to the first aspect and the foregoing possible implementations, in another possible implementation, when the antenna array is the dual-polarized antenna array, the uplink channel frequency response includes the first polarization uplink channel frequency response and the second polarization uplink channel frequency response. That the access network device constructs a target likelihood spectrum of the uplink channel frequency response based on the uplink channel frequency response and each uplink subcarrier frequency includes: The access network device constructs a first polarization likelihood spectrum of the uplink channel frequency response based on the first polarization uplink channel frequency response and each uplink subcarrier frequency; and the access network device constructs a second polarization likelihood spectrum of the uplink channel frequency response based on the second polarization uplink channel frequency response and each uplink subcarrier frequency, where a sum of the first polarization likelihood spectrum and the second polarization likelihood spectrum is the target likelihood spectrum.

In this way, in a dual-polarized antenna array scenario, the access network device may combine the first polarization likelihood spectrum and the second polarization likelihood spectrum to solve the model parameter, so that spectrum peaks formed on the target likelihood spectrum by a plurality of true paths can be more highlighted, and pseudo peaks formed on the target likelihood spectrum by interference such as noise are relatively suppressed, thereby reducing a quantity of iterations, and helping more simply, efficiently, and accurately determine the model parameter.

With reference to the first aspect and the foregoing possible implementations, in another possible implementation, when the antenna array is the dual-polarized antenna array, the amplitude of each path includes an amplitude, corresponding to the first polarization, of each path and an amplitude, corresponding to the second polarization, of each path, the initial phase of each path includes an initial phase, corresponding to the first polarization, of each path and an initial phase, corresponding to the second polarization, of each path, and the downlink channel frequency response includes a first polarization downlink channel frequency response and a second polarization downlink channel frequency response. That the access network device constructs a downlink channel frequency response based on the model parameter, the channel frequency response mathematical model, and each downlink subcarrier frequency includes: The access network device constructs the first polarization downlink channel frequency response based on the distance of each path, the angle of arrival of each path, the amplitude, corresponding to the first polarization, of each path, and the initial phase, corresponding to the first polarization, of each path in the model parameters, the channel frequency response mathematical model, and each downlink subcarrier frequency; and the access network device constructs the second polarization downlink channel frequency response based on the distance of each path, the angle of arrival of each path, the amplitude, corresponding to the second polarization, of each path, and the initial phase, corresponding to the second polarization, of each path in the model parameters, the channel frequency response mathematical model, and each downlink subcarrier frequency.

In other words, in a dual-polarized antenna array scenario, the access network device may separately construct dual-polarization downlink channel frequency responses based on dual-polarization information.

With reference to the first aspect and the foregoing possible implementations, in another possible implementation, the weight includes a first polarization weight and a second polarization weight. That the access network device calculates a beamforming weight of each downlink subcarrier frequency based on the downlink channel frequency response includes: The access network device calculates a beamforming weight, corresponding to the first polarization, of each downlink subcarrier frequency based on the first polarization downlink channel frequency response; and the access network device calculates a beamforming weight, corresponding to the second polarization, of each downlink subcarrier frequency based on the second polarization downlink channel frequency response.

In other words, in a dual-polarized antenna array scenario, the access network device may calculate each beamforming weight, corresponding to the dual-polarization, of each downlink subcarrier frequency based on dual-polarization information.

With reference to the first aspect and the foregoing possible implementations, in another possible implementation, the model parameter conforms to the following expression:

$$\begin{cases} \{\text{model parameter}\} = \underset{\{\text{model parameter}\}}{\arg\min} \; \|F_{UL}(k, i) - h_{UL}(k, i)\|_2^2 \\ F_{UL}(k, i \,|\, \lambda) = F(k, i \,|\, \lambda_{UL}) \end{cases},$$

where arg min represents a variable when an objective function is solved to obtain a minimum value, i represents the number of a subcarrier frequency, k represents the number of an array element, $\lambda$ represents the wavelength corresponding to a subcarrier frequency, $\lambda_{UL}$ represents a wavelength corresponding to an uplink subcarrier frequency, $F_{UL}$ represents an uplink channel frequency response mathematical model, F represents the channel frequency response mathematical model, $h_{UL}$ represents the uplink channel frequency response, and $\|\;\|_2$ represents a Euclidean norm.

In other words, in a single-polarized antenna array scenario, when the model parameter is solved by using an optimization algorithm, the model parameter meets the foregoing expression.

According to a second aspect, an embodiment of this application provides an access network device, including: a first calculation unit, configured to calculate an uplink channel frequency response; a second calculation unit, configured to calculate a model parameter in a channel frequency response mathematical model based on the uplink channel frequency response and each uplink subcarrier frequency, where the model parameter has reciprocity on uplink and downlink subcarrier frequencies; a construction unit, configured to construct a downlink channel frequency response based on the model parameter, the channel frequency response mathematical model, and each downlink subcarrier frequency; a third calculation unit, configured to calculate a beamforming weight of each downlink subcarrier frequency based on the downlink channel frequency response; and a beamforming unit, configured to perform downlink beamforming on an antenna array based on the weight, where the antenna array is a dual-polarized antenna array or a single-polarized antenna array.

With reference to the second aspect, in a possible implementation, the model parameter includes a distance of each path, an angle of arrival of each path, an amplitude of each path, and an initial phase of each path.

With reference to the second aspect and the foregoing possible implementation, in another possible implementation, the second calculation unit is specifically configured to: construct a target likelihood spectrum of the uplink channel frequency response based on the uplink channel frequency response and each uplink subcarrier frequency; calculate a target value of each path and a target value of the angle of arrival of each path based on the target likelihood spectrum; and calculate a target value of the amplitude of each path and a target value of the initial phase of each path based on the target value of the distance of each path and the target value of the angle of arrival of each path.

With reference to the second aspect and the foregoing possible implementations, in another possible implementation, the second calculation unit is specifically configured to: calculate an initial value of the distance of each path and an initial value of the angle of arrival of each path based on the target likelihood spectrum; and calculate the target value of the distance of each path and the target value of the angle of arrival of each path based on the initial value of the distance of each path and the initial value of the angle of arrival of each path by using an optimization algorithm.

With reference to the second aspect and the foregoing possible implementations, in another possible implementation, the second calculation unit is specifically configured to: calculate an initial value of the distance of each path and an initial value of the angle of arrival of each path based on the target likelihood spectrum; and calculate the target value of the distance of each path and the target value of the angle of arrival of each path based on the target likelihood spectrum, the initial value of the distance of each path, and the initial value of the angle of arrival of each path by using a search algorithm.

With reference to the second aspect and the foregoing possible implementations, in another possible implementation, the channel frequency response mathematical model is expressed as follows:

$$F(k, i) = \sum_{n=1}^{N} a_n e^{j\phi_n} e^{-j\frac{2\pi}{\lambda_i} d_n} e^{-j\frac{2\pi}{\lambda_i} kl \cos \theta_n},$$

where F(k,i) represents the channel frequency response mathematical model, n=1, 2, . . . , N represents a number of a path, N represents a quantity of paths, $d_n$ represents a distance of an $n^{th}$ path, $\theta_n$ represents an angle of arrival of the $n^{th}$ path, $a_n$ represents an amplitude of the $n^{th}$ path, $\phi_n$ represents an initial phase of the $n^{th}$ path, $\lambda_i$ represents a wavelength corresponding to an $i^{th}$ subcarrier frequency, =1, 2, . . . , I represents a number of a subcarrier frequency, I represents a quantity of subcarrier frequencies, k=1, 2, . . . , K represents a number of an array element, K represents a quantity of array elements, and l represents an array element spacing.

With reference to the second aspect and the foregoing possible implementations, in another possible implementation, the target likelihood spectrum of the uplink channel frequency response is expressed as follows:

$$\Theta(d, \theta) = \left\| \sum_{i=1}^{I} \sum_{k=1}^{K} h_{UL}(k, i) e^{j\frac{2\pi}{\lambda_{UL,i}} d} e^{j\frac{2\pi}{\lambda_{UL,i}} kl \cos \theta} \right\|_2^2,$$

where $\Theta(d,\theta)$ represents the target likelihood spectrum, $h_{UL}(k,i)$ represents the uplink channel frequency response, d represents a distance of a path, $\theta$ represents an angle of arrival of a path, $\lambda_{UL,i}$ represents a wavelength corresponding to an $i^{th}$ uplink subcarrier frequency, i=1, 2, . . . , I represents the number of a subcarrier frequency, I represents the quantity of subcarrier frequencies, k=1, 2, . . . , K represents the number of an array element, K represents the quantity of array elements, l represents the array element spacing, and $\|\;\|_2$ represents a Euclidean norm.

With reference to the second aspect and the foregoing possible implementations, in another possible implementation, when the antenna array is a planar array, the channel frequency response mathematical model is expressed as follows:

$$F(k_H, k_V, i) = \sum_{n=1}^{N} a_n e^{j\phi_n} e^{-j\frac{2\pi}{\lambda_i}d_n} e^{-j\frac{2\pi}{\lambda_i}k_V l \cos \gamma_n} e^{-j\frac{2\pi}{\lambda_i}k_H l \cos \varphi_n \sin \gamma_n},$$

where $F(k_H,k_V,i)$ represents the channel frequency response mathematical model, n=1, 2, . . . , N represents a number of a path, N represents a quantity of paths, $d_n$ represents a distance of an $n^{th}$ path, $\theta_n$ represents an angle of arrival of the $n^{th}$ path, $a_n$ represents an amplitude of the $n^{th}$ path, $\phi_n$ represents an initial phase of the $n^{th}$ path, $\lambda_i$ represents a wavelength corresponding to an $i^{th}$ subcarrier frequency, i=1, 2, . . . , I represents a number of a subcarrier frequency, I represents a quantity of subcarrier frequencies, k=1, 2, . . . , K represents a number of an array element, K represents a quantity of array elements, l represents an array element spacing, $k_H$ represents a quantity of rows of the antenna array, $k_V$ represents a quantity of columns of the antenna array, $\varphi_n$ represents a horizontal angle of the $n^{th}$ path, and $\gamma_n$ represents a pitch angle of the $n^{th}$ path.

With reference to the second aspect and the foregoing possible implementations, in another possible implementation, when the antenna array is the dual-polarized antenna array, the uplink channel frequency response includes a first polarization uplink channel frequency response and a second polarization uplink channel frequency response, the model parameter includes a first polarization model parameter and a second polarization model parameter, and the model parameter conforms to the following expression:

$$\begin{cases} \{\text{model parameter}\} = \underset{\{model\ parameter\}}{\arg\min} \ \|F_{UL}^+(k, i) - h_{UL}^+(k, i)\|_2^2 + \|F_{UL}^-(k, i) - h_{UL}^-(k, i)\|_2^2 \\ F_{UL}^+(k, i \mid \lambda, \text{model parameter}) = F(k, i \mid \lambda_{UL}, \text{first polarization model parameter}) \\ F_{UL}^-(k, i \mid \lambda, \text{model parameter}) = F(k, i \mid \lambda_{UL}, \text{second polarization model parameter}) \end{cases},$$

where arg min represents a variable when an objective function is solved to obtain a minimum value, i represents the number of a subcarrier frequency, k represents the number of an array element, λ represents a wavelength corresponding to a subcarrier frequency, $\lambda_{UL}$ represents a wavelength corresponding to an uplink subcarrier frequency, $F_{UL}^+$ represents a first polarization uplink channel frequency response mathematical model, $F_{UL}^-$ represents a second polarization uplink channel frequency response mathematical model, F represents the channel frequency response mathematical model, $h_{UL}^+$ represents the first polarization uplink channel frequency response, $h_{UL}^-$ represents the second polarization uplink channel frequency response, and $\| \|_2$ represents a Euclidean norm.

With reference to the second aspect and the foregoing possible implementations, in another possible implementation, when the antenna array is the dual-polarized antenna array, the uplink channel frequency response includes the first polarization uplink channel frequency response and the second polarization uplink channel frequency response, and the second calculation unit is specifically configured to: construct a first polarization likelihood spectrum of the uplink channel frequency response based on the first polarization uplink channel frequency response and each uplink subcarrier frequency; and construct a second polarization likelihood spectrum of the uplink channel frequency response based on the second polarization uplink channel frequency response and each uplink subcarrier frequency, where a sum of the first polarization likelihood spectrum and the second polarization likelihood spectrum is the target likelihood spectrum.

With reference to the second aspect and the foregoing possible implementations, in another possible implementation, when the antenna array is the dual-polarized antenna array, the amplitude of each path includes an amplitude, corresponding to the first polarization, of each path and an amplitude, corresponding to the second polarization, of each path, the initial phase of each path includes an initial phase, corresponding to the first polarization, of each path and an initial phase, corresponding to the second polarization, of each path, and the downlink channel frequency response includes a first polarization downlink channel frequency response and a second polarization downlink channel frequency response. The construction unit is specifically configured to: construct the first polarization downlink channel frequency response based on the distance of each path, the angle of arrival of each path, the amplitude, corresponding to the first polarization, of each path, and the initial phase, corresponding to the first polarization, of each path in the model parameters, the channel frequency response mathematical model, and each downlink subcarrier frequency; and construct the second polarization downlink channel frequency response based on the distance of each path, the angle of arrival of each path, the amplitude, corresponding to the second polarization, of each path, and the initial phase, corresponding to the second polarization, of each path in the model parameters, the channel frequency response mathematical model, and each downlink subcarrier frequency.

With reference to the second aspect and the foregoing possible implementations, in another possible implementation, the weight includes a first polarization weight and a second polarization weight, and the third calculation unit is specifically configured to: calculate a beamforming weight, corresponding to the first polarization, of each downlink subcarrier frequency based on the first polarization downlink channel frequency response; and calculate a beamforming weight, corresponding to the second polarization, of each downlink subcarrier frequency based on the second polarization downlink channel frequency response.

With reference to the second aspect and the foregoing possible implementations, the model parameter conforms to the following expression:

$$\begin{cases} \{\text{model parameter}\} = \underset{\{model\ parameter\}}{\arg\min} \ \|F_{UL}(k, i) - h_{UL}(k, i)\|_2^2 \\ F_{UL}(k, i \mid \lambda) = F(k, i \mid \lambda_{UL}) \end{cases},$$

where arg min represents a variable when an objective function is solved to obtain a minimum value, i represents the number of a subcarrier frequency, k represents the number of an array element, λ represents the wavelength corresponding to a subcarrier frequency, $\lambda_{UL}$ represents a wavelength corresponding to an uplink subcarrier frequency, $F_{UL}$ represents an uplink channel frequency response mathematical model, F represents the channel frequency response mathematical model, $h_{UL}$ represents the uplink channel frequency response, and $\| \|_2$ represents a Euclidean norm.

According to a third aspect, an embodiment of this application provides an access network device, including: a processor, a memory, a bus, and a communications interface. The processor and the memory are connected to each other by using the bus; the memory is configured to store a computer executable instruction; and when the access network device runs, the processor executes the computer executable instruction stored in the memory, so that the access network device performs the beamforming method in any one of the first aspect or the possible implementations of the first aspect.

According to a fourth aspect, an embodiment of this application provides a computer readable storage medium, configured to store a computer software instruction used by the access network device. When the computer software instruction is run on a computer, the computer can perform the beamforming method in any one of the first aspect or the possible implementations of the first aspect.

According to a fifth aspect, an embodiment of this application provides a computer program product including an instruction. When the instruction is run on a computer, the computer can perform the beamforming method in any one of the first aspect or the possible implementations of the first aspect.

For beneficial effects corresponding to the second aspect to the fifth aspect, refer to related descriptions in the first aspect. Details are not described herein again.

DESCRIPTION OF EMBODIMENTS

Figure 1:
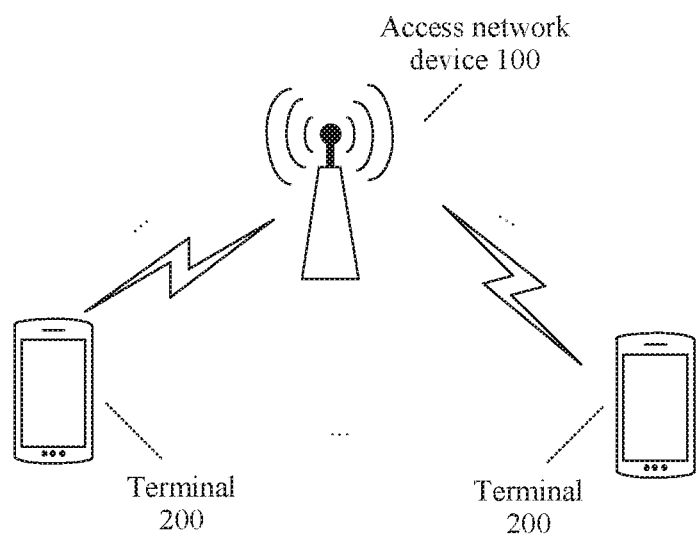
FIG. 1 is a schematic structural diagram of a communications system according to an embodiment of this application.

For ease of understanding, some concepts related to the embodiments of this application are explained as examples for reference, as shown below.

Beamforming: A technology of forming a desired ideal signal by weighting and combining signals received by a plurality of antenna array elements.

Frequency: A frequency of each subcarrier.

Path: A route that is formed by an electromagnetic wave on a communications channel after deflection and diffraction and that connects a base station and a user.

Distance of the path: A length of the route.

Angle of arrival of the path: An angle between the route when the base station is reached and a direction of an antenna array of the base station.

Likelihood spectrum: A type of spatial spectrum of conventional spectral estimation. The spatial spectrum may also be referred to as a Bartlett spectrum or the like, and is a two-dimensional function about the distance and the angle of arrival, or may be a one-dimensional function about the distance or the angle of arrival.

Polarization direction: A direction of electric field strength formed during antenna radiation.

Single-polarized antenna: An antenna including only one polarization direction.

Dual-polarized antenna: An antenna that has a combination of +45° and −45° polarization directions orthogonal to each other, and that works in a duplex mode.

Array element: An antenna element, which is an element on an antenna array, has steering and electromagnetic wave amplification functions, and is configured to strengthen an electromagnetic signal received by the antenna array.

Optimization: It means obtaining a better solution to a required problem by using an algorithm.

Search algorithm: A method for purposefully exhausting some or all possible cases in solution space of a problem based on high performance of a computer, to obtain a solution to the problem.

Steering vector: A vector having a guiding direction and a pointing direction.

The following describes technical solutions in the embodiments of this application with reference to accompanying drawings in the embodiments of this application. In descriptions in the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The technical solutions provided in the embodiments of this application may be applied to access network devices in which an antenna array is disposed in various FDD mobile communications systems. For example, the mobile communications systems herein may include a third generation mobile communications technology (3G) communications system, a fourth generation mobile communications technology (4G) communications system, and a future evolved network, such as a fifth generation mobile communications technology (5G) communications system. For example, the mobile communications systems herein may include a long term evolution (LTE) system, a 3G-related cellular system, and another communications system of such a type. Particularly, the technical solutions may be applied to a 5G ultra dense networking (UDN) system. It should be noted that, a 5G standard may include scenarios such as machine-to-machine (M2M), D2M, macro-to-micro communication, enhanced mobile broadband (eMBB), ultra-reliable low-latency communication (uRLLC), and massive machine type communications (mMTC), and these scenarios may include but are not limited to: a scenario of communication between access network devices, a scenario of communication between an access network device and a terminal, and the like.

The technical solutions provided in the embodiments of this application may be applied to a system architecture shown in FIG. 1. The system architecture may include an access network device 100 and one or more terminals 200 connected to the access network device 100. An antenna array is disposed in the access network device 100. The access network device 100 sends and receives signals by using the antenna array, to communicate with the terminal 200. Before sending a signal by using the antenna array, the access network device 100 may configure a beamforming weight, to perform downlink beamforming based on the weight, and send the signal by using the antenna array.

The access network device herein may be a relay station, an access point, or the like. The access network device may be a base transceiver station (BTS) in a global system for mobile communications (GSM) or a code division multiple access (CDMA) network, or may be an NB (NodeB) in wideband code division multiple access (WCDMA), or may be an eNB or eNodeB (evolutional NodeB) in LTE. The access network device 100 may alternatively be a radio controller in a cloud radio access network (CRAN) scenario. The access network device 100 may alternatively be a network device in a future 5G network, a network device in a future evolved public land mobile network (PLMN), or the like. The network device in the future 5G network may include a new radio NodeB, a next generation NodeB (gNB), a transmission point, or the like.

Figure 2:
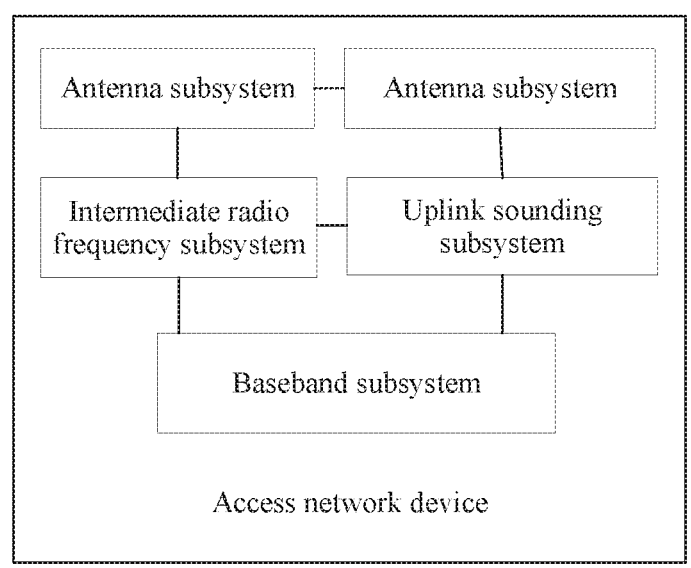
FIG. 2 is a schematic structural diagram of an access network device according to an embodiment of this application.

In an example, the access network device may be implemented by using a structure shown in FIG. 2. As shown in FIG. 2, the access network device may include an uplink sounding subsystem, an intermediate radio frequency subsystem, a baseband subsystem, and an antenna subsystem. The uplink sounding subsystem may be configured to receive a signal, for example, a channel sounding reference signal (SRS), sent by the terminal, calculate an uplink channel frequency response, and the like. The baseband subsystem may be configured to implement a basic physical layer algorithm. The intermediate radio frequency subsystem may be configured to perform up-conversion based on a baseband signal (that is, move the signal from a fundamental frequency to a carrier frequency), and resolve problems such as distortion and errors in an up-conversion process. The antenna subsystem includes an antenna array, and may be configured to obtain an array structure of the antenna array, and calculate a beam directivity pattern of the antenna array after the antenna array is weighted, that is, configured to perform downlink beamforming. It should be noted that, in a specific implementation process, the access network device is not limited to the hardware architecture shown in FIG. 2, and another general hardware architecture may be used. A beamforming weight of the antenna array may be specifically configured in the intermediate radio frequency subsystem or the baseband subsystem.

In the prior-art beamforming solution, a beamforming weight needs to be constructed based on a PMI fed back by a terminal, resulting in relatively poor timeliness of beamforming and a relatively large error. In practice, ideally, when a beamforming weight vector of each array element in the antenna array and a corresponding downlink channel frequency response are conjugated to each other in distribution in an antenna quantity domain, a terminal can obtain a maximum SNR/receive power gain. In this case, a base station needs to learn of the downlink channel frequency response before sending. Currently, two main standards are used as follows: In a time division duplex (TDD) standard, uplink and downlink channel frequency responses have reciprocity in distribution in the antenna quantity domain. In a frequency division duplex (FDD) standard, due to a difference between frequency bands, uplink and downlink channel frequency responses do not have good reciprocity in distribution in the antenna quantity domain as in TDD. In view of this, the embodiments of this application provide a beamforming method. An access network device may construct a downlink channel frequency response based on an uplink channel frequency response and a channel frequency response mathematical model, and calculate a beamforming weight based on the downlink channel frequency response, to perform downlink beamforming. Therefore, when the beamforming weight is calculated, a terminal does not need to perform feedback as in the prior art, thereby improving beamforming timeliness, and reducing an error caused by relatively poor timeliness.

The solutions provided in the embodiments of this application are described below in detail with reference to accompanying drawings by using the scenario shown in FIG. 1 as an example.

Figure 3:
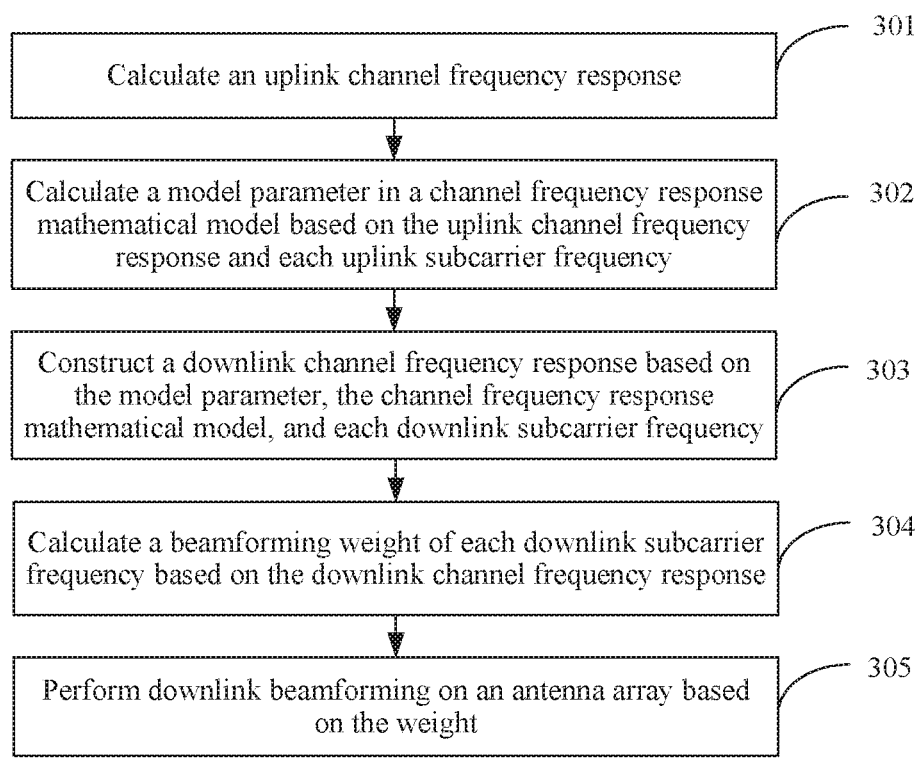
FIG. 3 is a flowchart of a beamforming method according to an embodiment of this application.

Referring to FIG. 3, an embodiment of this application provides a beamforming method, including the following steps.

301. An access network device calculates an uplink channel frequency response.

The uplink channel frequency response is used to describe a response status of an uplink channel on each array element of an antenna array and each uplink subcarrier frequency. In this step, the access network device may calculate the uplink channel frequency response based on an uplink signal, such as an SRS, received from a terminal.

302. The access network device calculates a model parameter in a channel frequency response mathematical model based on the uplink channel frequency response and each uplink subcarrier frequency, where the model parameter has reciprocity on uplink and downlink subcarrier frequencies.

The channel frequency response mathematical model may be preset in the access network device. The channel frequency response mathematical model is used to describe a channel frequency response, that is, a response status of a channel on each subcarrier frequency. The channel frequency response mathematical model includes at least one model parameter. The model parameter is a channel multipath parameter, and has reciprocity on uplink and downlink subcarrier frequencies.

A frequency spacing between an uplink subcarrier frequency and a downlink subcarrier frequency is relatively large, a frequency spacing between uplink subcarrier frequencies is relatively small, and a frequency spacing between downlink subcarrier frequencies is relatively small. Therefore, when the model parameter has reciprocity on the uplink and downlink subcarrier frequencies, it may be understood that, the model parameter also has reciprocity on the uplink subcarrier frequencies, and the model parameter also has reciprocity on the downlink subcarrier frequencies. In other words, the model parameter has reciprocity on the uplink subcarrier frequencies and the downlink subcarrier frequencies. It may be understood as that, the model parameter may be applied to the uplink and downlink subcarrier frequencies, and frequency shifting may be performed between the uplink and downlink subcarrier frequencies.

In this way, because the model parameter in the channel frequency response mathematical model may be applied to various subcarrier frequencies, when an uplink subcarrier frequency is substituted into the channel frequency response mathematical model, the channel frequency response mathematical model may be used to represent an uplink channel frequency response; and when a downlink subcarrier frequency is substituted into the channel frequency response mathematical model, the channel frequency response mathematical model may be used to represent a downlink channel frequency response.

Therefore, after the model parameter based on the uplink channel frequency response is obtained through calculation, when a downlink subcarrier frequency and the model parameter are substituted into the channel frequency response mathematical model, a downlink channel frequency response may be obtained. In other words, when the model parameter in the channel frequency response mathematical model has reciprocity on the uplink and downlink subcarrier frequencies, a process of reconstructing a downlink channel is simpler.

303. The access network device constructs a downlink channel frequency response based on the model parameter, the channel frequency response mathematical model, and each downlink subcarrier frequency.

After the model parameter in the channel frequency response mathematical model is obtained in step 302, the access network device may substitute a downlink subcarrier frequency and the obtained model parameter into the channel frequency response mathematical model, to obtain the downlink channel frequency response.

304. The access network device calculates a beamforming weight of each downlink subcarrier frequency based on the downlink channel frequency response.

When a beamforming weight and a corresponding downlink channel frequency response are conjugated to each other in distribution in an antenna quantity domain, a terminal can obtain a maximum beamforming SNR gain. Therefore, after the downlink channel frequency response is obtained in step 303, the access network device may calculate the beamforming weight of each downlink subcarrier frequency based on the downlink channel frequency response.

An expression of a beamforming weight $w_i$ corresponding to an $i^{th}$ downlink subcarrier frequency may be the following Formula 1:

$$w_i = \frac{[h_{DL}(1, i)\ h_{DL}(2, i)\ \ldots\ h_{DL}(k, i)\ldots h_{DL}(K, i)]^H}{\|[h_{DL}(1, i)\ h_{DL}(2, i)\ \ldots\ h_{DL}(k, i)\ldots h_{DL}(K, i)]^H\|_2} \quad \text{Formula 1}$$

where in Formula 1, $h_{DL}(k,i)$ represents a downlink channel frequency response of the $i^{th}$ downlink subcarrier frequency corresponding to a $k^{th}$ array element, $[\ ]^H$ represents a conjugate matrix, and $\|\ \|_2$ represents a Euclidean norm.

The access network device may obtain a beamforming weight corresponding to each downlink subcarrier frequency on each array element according to Formula 1.

305. The access network device performs downlink beamforming on an antenna array based on the weight, where the antenna array is a dual-polarized antenna array or a single-polarized antenna array.

Each array element in the dual-polarized antenna array corresponds to two polarization directions: a first polarization direction and a second polarization direction. Each array element in the single-polarized antenna array corresponds to one polarization direction. After obtaining the beamforming weight corresponding to each downlink subcarrier frequency, the access network device may perform downlink beamforming by weighting each array element of the antenna array by using the beamforming weight corresponding to each downlink subcarrier frequency, that is, multiply a weight of each array element of the antenna array by a signal on the array element, which is equivalent to obtaining a dot product of a weight vector of the antenna array and a signal vector. Then the access network device sends the signal.

In the beamforming method described in steps 301 to 305, the access network device can directly construct the downlink channel frequency response based on the uplink channel frequency response and the channel frequency response mathematical model, and calculate the beamforming weight based on the downlink channel frequency response, to perform beamforming. Therefore, when the beamforming weight is calculated, a terminal does not need to perform feedback as in the prior art, thereby improving beamforming timeliness, and reducing an error caused by relatively poor timeliness.

It should be noted that, in this embodiment of this application, because the model parameter in the channel frequency response model has reciprocity on uplink and downlink subcarrier frequencies, after the model parameter is obtained based on the uplink channel frequency response, the downlink channel frequency response can be obtained by substituting the model parameter and each downlink subcarrier frequency into the channel frequency response mathematical model. Therefore, such a method for constructing a downlink channel frequency response is simple, real-time, and easy to implement, beamforming weight calculation complexity is reduced, and processing efficiency of the access network device is improved.

In addition, in an existing technical solution in which a beamforming weight is constructed based on a PMI reported by a terminal, an access network device constructs a codebook set, and selects a codebook that achieves a maximum receive power gain to obtain an approximately optimal weight, which is equivalent to quantizing space in which $h_{DL}$ is located, and selecting a candidate value that is closest to a true value from a limited quantity of discrete values. This inevitably causes a quantization error. If the codebook set is sparse, the quantization error increases, and consequently beamforming performance is affected; or if the codebook set is dense, especially in the case of massive MIMO, calculation complexity is high, and consequently efficiency is affected. Therefore, the PMI quantization error has non-ignorable impact on performance.

In addition, in the existing technical solution in which a beamforming weight is constructed based on a PMI reported by a terminal, the access network device needs to configure corresponding codebook sets for different array elements and terminals. A huge quantity of codebook sets need to be configured to ensure a minimum quantization error. According to a 3GPP standard document, the access network device side needs 16 codebooks in the case of four ports, and needs 256 codebooks in the case of eight ports. It can be learned that, 16 ports, 32 ports, or even 64 or 128 ports needed in a massive MIMO system need a larger quantity of codebook sets, which will inevitably increase calculation workload of a communications system and lower data processing efficiency.

According to the technical solution provided in this embodiment of this application, the access network device directly constructs the downlink channel frequency response, and constructs the beamforming weight based on the downlink channel frequency response, so that a quantization error and huge data processing, calculation, and cache workload caused by a codebook set can be avoided.

In addition, the prior art further includes a beamforming technology based on angle of arrival (direction of arrival, DOA) estimation. A specific implementation of the beamforming technology is as follows: An access network device estimates a DOA based on an uplink SRS signal, and calculates a DOA of a dominate path of a channel; substitutes the DOA into a steering vector as a beamforming weight; and perform weighting on an antenna array by using the weight as a beamforming weight. This solution heavily depends on accuracy of the estimated DOA. When the estimated DOA deviates, the beamforming weight also deviates. In addition, in this solution, only the DOA of the dominate path of the channel is estimated and substituted into the steering vector as a beamforming weight. In other words, another path having relatively weak energy is ignored. Such a manner is relatively applicable to a line of sight (LOS) channel having only one path or a channel whose dominant path is quite significant and another path is very weak. However, for a non line of sight (NLOS) channel, especially when there are a plurality of paths having similar energy, only one DOA can be obtained in this manner. Therefore, a weight calculated based on the DOA also has a relatively large error.

Different from the existing beamforming technology based on angle of arrival DOA estimation, the technical solution provided in this embodiment of this application does not depend on DOA estimation for a single dominant path. Instead, the downlink channel frequency response is directly constructed, and the beamforming weight is constructed based on the downlink channel frequency response. In this way, accuracy of an estimated DOA of the single dominant path does not have decisive impact on performance. In addition, the technical solution is quite applicable to the NLOS channel.

In this embodiment of this application, the channel frequency response mathematical model having the feature that a model parameter has reciprocity on uplink and downlink subcarrier frequencies may be in a plurality of specific forms, and the channel frequency response mathematical model may specifically have a plurality of different combinations of model parameters. For example, in a possible implementation, the model parameter may include a distance of each path, an angle of arrival of each path, an amplitude of each path, and an initial phase of each path. The distance of each path, the angle of arrival of each path, the amplitude of each path, and the initial phase of each path have reciprocity on uplink and downlink subcarrier frequencies. It should be noted that the "distance of each path" herein is not one parameter; and when there are N paths, the "distance of each path" herein represents distances of the N paths, that is, N parameters. The case is similar for the other model parameters (the angle of arrival of each path, the amplitude of each path, and the initial phase of each path).

In addition, the channel frequency response mathematical model provided in this embodiment of this application is a simplified model, does not include an antenna directivity pattern, and does not require a complex calculation process such as domain transformation. Therefore, a process of constructing a downlink channel frequency response of an antenna array (especially the dual-polarized antenna array) by using the channel frequency response mathematical model is relatively simple.

For example, when the model parameter includes the distance of each path, the angle of arrival of each path, the amplitude of each path, and the initial phase of each path, an expression of the channel frequency response mathematical model may be the following Formula 2:

$$F(k, i) = \sum_{n=1}^{N} a_n e^{j\phi_n} e^{-j\frac{2\pi}{\lambda_i} d_n} e^{-j\frac{2\pi}{\lambda_i} kl \cos \theta_n} \quad \text{Formula 2}$$

where F(k,i) represents the channel frequency response mathematical model, n=1, 2, . . . , N represents a number of a path, N represents a quantity of paths, $d_n$ represents a distance of an $n^{th}$ path, $\theta_n$ represents an angle of arrival of the $n^{th}$ path, $a_n$ represents an amplitude of the $n^{th}$ path, $\phi_n$ represents an initial phase of the $n^{th}$ path, $\lambda_i$ represents a wavelength corresponding to an $i^{th}$ subcarrier frequency, i=1, 2, . . . , I represents a number of a subcarrier frequency, I represents a quantity of subcarrier frequencies, k=1, 2, . . . , K represents a number of an array element, K represents a quantity of array elements, and l represents an array element spacing.

For example, when the model parameter includes the distance, the angle of arrival, the amplitude, and the initial phase of each path, another expression of the channel frequency response mathematical model may be the following Formula 3:

$$F(k_H, k_V, i) = \sum_{n=1}^{N} a_n e^{j\phi_n} e^{-j\frac{2\pi}{\lambda_i} d_n} e^{-j\frac{2\pi}{\lambda_i} k_V l \cos \gamma_n} e^{-j\frac{2\pi}{\lambda_i} k_H l \cos \varphi_n \sin \gamma_n} \quad \text{Formula 3}$$

Formula 3 represents a channel frequency response mathematical model corresponding to the antenna array when the antenna array is a planar array, where $F(k_H, k_V, i)$ represents the channel frequency response mathematical model, $k_H$ represents a quantity of rows of the antenna array, $k_V$ represents a quantity of columns of the antenna array, $\varphi_n$ represents a horizontal angle of an $n^{th}$ path, and $\gamma_n$ represents a pitch angle of the $n^{th}$ path.

In addition, in this embodiment of this application, the access network device may solve, in step 302 in a plurality of manners, the model parameter in the channel frequency response mathematical model based on the uplink channel frequency response and each uplink subcarrier frequency. For example, in a first method for solving the model parameter, the access network device may construct a target likelihood spectrum about the uplink channel frequency response, and solve each model parameter based on the target likelihood spectrum. In a second method for solving the model parameter, the access network device may directly solve each model parameter by using an optimization algorithm.

For example, when the model parameter includes the distance of each path, the angle of arrival of each path, the amplitude of each path, and the initial phase of each path, in the first possible implementation, a specific implementation of step 302 may include the following steps.

3021. The access network device constructs a target likelihood spectrum of the uplink channel frequency response based on the uplink channel frequency response and each uplink subcarrier frequency.

The target likelihood spectrum herein is a function about at least one parameter of a distance of a path and an angle of arrival of a path.

3022. The access network device calculates a target value of each path and a target value of an angle of arrival of each path based on the target likelihood spectrum.

3023. The access network device calculates a target value of an amplitude of each path and a target value of an initial phase of each path based on the target value of the distance of each path and the target value of the angle of arrival of each path.

A target value of each model parameter is an optimal value of each model parameter. Because the target likelihood spectrum is a function about at least one parameter of the distance of a path and the angle of arrival of a path, first, the target value of each path and the target value of the angle of arrival of each path may be obtained based on the target likelihood spectrum, and then the target value of the amplitude of each path and the target value of the initial phase of each path may be calculated based on the target value of the distance of each path and the target value of the angle of arrival of each path.

Further, the first possible implementation may specifically include Manner A and Manner B.

In Manner A, step 3022 may specifically include the following steps:

401. The access network device calculates an initial value of the distance of each path and an initial value of the angle of arrival of each path based on the target likelihood spectrum.

402. The access network device calculates the target value of the distance of each path and the target value of the angle of arrival of each path based on the initial value of the distance of each path and the initial value of the angle of arrival of each path by using an optimization algorithm.

In Manner B, step 3022 may specifically include the following steps:

501. The access network device calculates an initial value of the distance of each path and an initial value of the angle of arrival of each path based on the target likelihood spectrum.

502. The access network device calculates the target value of the distance of each path and the target value of the angle of arrival of each path based on the target likelihood spectrum, the initial value of the distance of each path, and the initial value of the angle of arrival of each path by using a search algorithm.

The initial value of the distance of each path and the initial value of the angle of arrival of each path that are obtained through calculation in step 401 and step 501 are merely initial estimated values, and may not be optimal values of the distance of each path and the angle of arrival of each path. Therefore, the optimal values of the distance of each path and the angle of arrival of each path need to be further calculated based on the initial values of the distance of each path and the angle of arrival of each path. In other words, the target values of the distance of each path and the angle of arrival of each path need to be estimated.

In step 401, step 402, and step 501, the access network device may construct a target likelihood spectrum, and then determine a peak on the target likelihood spectrum by using the search algorithm, to solve the model parameter. Such a method is relatively simple. In step 502, the access network device may construct an objective function, and determine a peak on the objective function by using the optimization algorithm (for example, a maximum likelihood method), to solve the model parameter. Such a method is more accurate.

In an actual access network device, an antenna array may be a dual-polarized antenna array, or may be a single-polarized antenna array. Beamforming methods in a single-polarized antenna array scenario and a dual-polarized antenna array scenario are separately described in detail below based on the foregoing several model parameter solving methods by using the channel frequency response mathematical model shown in Formula 2 as an example.

Scenario 1: Single-Polarized Antenna Array Scenario

Figure 4:
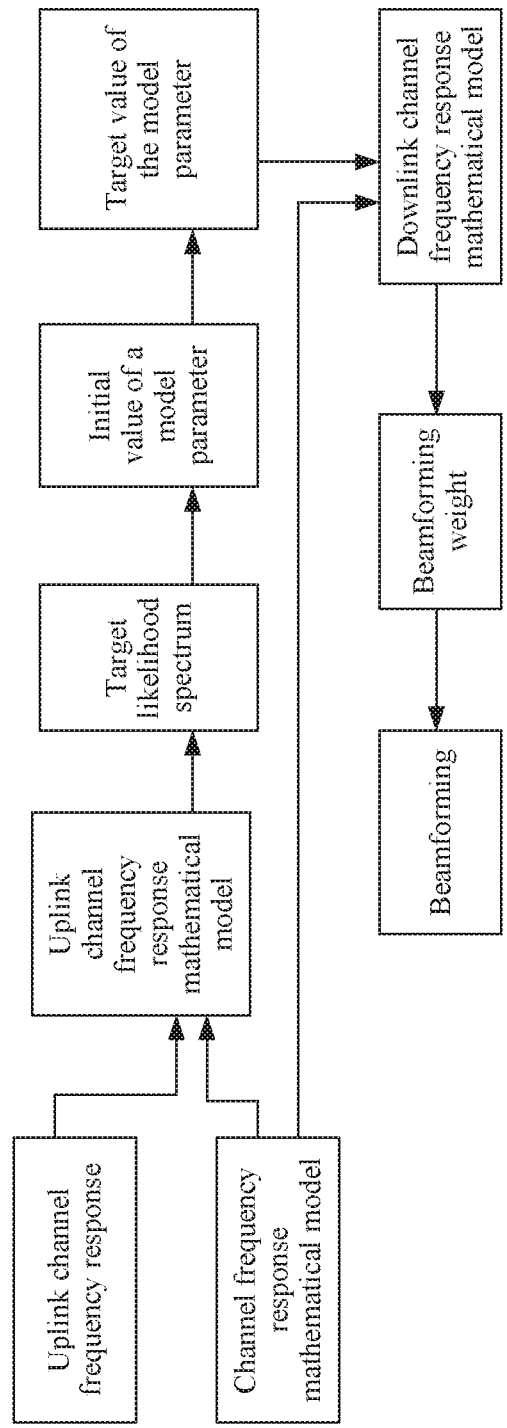
FIG. 4 is a flowchart of another beamforming method according to an embodiment of this application.

For a flowchart of a beamforming method corresponding to this scenario, refer to FIG. 4. In this scenario, the access network device may obtain, through calculation, the uplink channel frequency response $h_{UL}(k,i)$ in step 301. Based on each uplink subcarrier frequency and the channel frequency response mathematical model shown in Formula 2, $h_{UL}(k,i)$ may be represented by an uplink channel frequency response mathematical model $F_{UL}(k,i)$ shown in Formula 4:

$$h_{UL}(k, i) = F_{UL}(k, i) = \sum_{n=1}^{N} a_n e^{j\phi_n} e^{-j\frac{2\pi}{\lambda_{UL,i}}d_n} e^{-j\frac{2\pi}{\lambda_{UL,u}}kl\cos\theta_n} \quad \text{Formula 4}$$

where $\lambda_{UL,i}$ represents a wavelength corresponding to an $i^{th}$ subcarrier frequency, and $F_{UL}(k,i)$ represents the uplink channel frequency response mathematical model. For descriptions of other parameters in Formula 4, refer to related descriptions in Formula 2.

The access network device may construct the target likelihood spectrum of the uplink channel frequency response in step 3021 based on the uplink channel frequency response $h_{UL}(k,i)$ shown in Formula 4. The target likelihood spectrum may be specifically in a form shown in Formula 5:

$$\Theta(d, \theta) = \left\| \sum_{i=1}^{I} \sum_{k=1}^{K} h_{UL}(k, i) e^{j\frac{2\pi}{\lambda_{UL,i}}d} e^{j\frac{2\pi}{\lambda_{UL,i}}kl\cos\theta} \right\|_2^2 \quad \text{Formula 5}$$

where $\Theta(d,\theta)$ represents the target likelihood spectrum, $h_{UL}(k,i)$ represents the uplink channel frequency response, d represents a distance of a path, $\theta$ represents an angle of arrival of a path, $\lambda_{UL,i}$ represents a wavelength corresponding to an $i^{th}$ uplink subcarrier frequency, i=1, 2, . . . , I represents the number of a subcarrier frequency, I represents the quantity of subcarrier frequencies, k=1, 2, . . . , K represents the number of an array element, K represents the quantity of array elements, l represents the array element spacing, and a superscript "2" means being squared.

In Formula 5, different from the distance $d_n$ of each path, d is used to represent the parameter: the distance of a path; and different from the angle $\theta_n$ of arrival of each path. $\theta$ is used to represent the parameter: the angle of arrival of a path.

The access network device may calculate the initial value of the distance of each path and the initial value of the angle of arrival of each path in step 401 or step 501 based on the target likelihood spectrum shown in Formula 5.

Specifically, parameter space corresponding to the target likelihood spectrum shown in Formula 5 may be divided into a plurality of mesh points, and the access network device may search, through traversal, on the mesh points for peaks by using the search algorithm, to estimate the initial value of the distance $d_n$ of each path and the initial value of the angle $\theta_n$ of arrival of each path. When the peaks are searched for, through traversal, on the mesh points, a threshold range (for example, 10 dB less than a highest peak) may be preset, and a quantity of peaks within the threshold range is a quantity N of paths.

It should be noted that, the target likelihood spectrum in this embodiment of this application is a spatial spectrum formed through coherent accumulation after conjugate compensation for a steering vector $$(e^{-j\frac{2\pi}{\lambda_{UL,i}}d_n}, e^{-j\frac{2\pi}{\lambda_{UL,i}}kl\cos\theta_n})$$

in Formula 4) of the uplink channel frequency response.

When the target likelihood spectrum obtained through conjugate compensation is searched for a peak, a steering vector on each k, i is eliminated only when a distance and an angle of arrival of a path at true values are found. That is, phases on all k, i can be aligned, and a maximum value can be reached after coherent accumulation. Phases at all other locations cannot be aligned. In other words, a maximum value cannot be reached after coherent accumulation. Therefore, in this conjugate compensation manner, a true value can be highlighted on the target likelihood spectrum as a peak, so that the model parameter is more quickly and accurately solved by searching for a spectrum peak.

In addition, in this manner of searching, through traversal, for peaks corresponding to mesh points, $d_n$ and $\theta_n$ are merely roughly estimated, and a peak corresponding to a mesh point may not be a peak of the entire target likelihood spectrum. Therefore, an obtained value of the model parameter is merely an initial value, and may not be an optimal value of the model parameter.

After obtaining the initial value of the distance of each path and the initial value of the angle of arrival of each path, in step 402, the access network device may substitute the obtained initial values of $d_n$ and $\theta_n$ into a subsequent optimum solving process for further accurate estimation, and the amplitude $a_n$ of each path and the initial phase $\phi_n$ of each path are represented by $d_n$ and $\theta_n$ through element elimination. In this way, an optimal value of $d_n$ and an optimal value of $\theta_n$, namely, the target value of $d_n$ and the target value of $\theta_n$, are first calculated, and then an optimal value of $a_n$ and an optimal value of $\theta_n$, namely, the target value of $a_n$ and the target value of $\phi_n$, are calculated based on the target value of $d_n$ and the target value of $\theta_n$.

A process of solving the model parameter by using the optimization algorithm may be specifically implemented as follows:

It can be learned from Formula 4 that, for each estimated model parameter value group $\{\hat{d}_n,\hat{\theta}_n,\hat{a}_n,\hat{\phi}_n\}_{n=1}^N$, an uplink channel frequency response mathematical model $F'_{UL}(k,i)$ may be constructed by using the channel frequency response model:

$$F'_{UL}(k,i) = \sum_{n=1}^{N} \hat{a}_n e^{j\hat{\phi}_n} e^{-j\frac{2\pi}{\lambda_{UL,i}}\hat{d}_n} e^{-j\frac{2\pi}{\lambda_{UL,i}}kl\cos\hat{\theta}_n} \quad \text{Formula 6}$$

where $F'_{UL}(k,i)$ represents the uplink channel frequency response mathematical model $F_{UL}(k,i)$ corresponding to the estimated model parameter value group $\{\hat{d}_n,\hat{\theta}_n,\hat{a}_n,\hat{\phi}_n\}_{n=1}^N$.

An optimal estimated model parameter value $\{\hat{d}_n^*,\hat{\theta}_n^*,\hat{a}_n^*,\hat{\phi}_n^*\}_{n=1}^N$ makes $F_{UL}(k,i)$ closest to true $h_{UL}(k,i)$ obtained through calculation in step 301. Therefore, a model parameter estimation problem may be transformed into an optimization problem shown below:

$$\{\hat{d}_n^*, \hat{\theta}_n^*, \hat{a}_n^*, \hat{\phi}_n^*\}_{n=1}^N = \underset{\{\hat{d}_n,\hat{\theta}_n,\hat{a}_n,\hat{\phi}_n\}_{n=1}^N}{\arg\min} \|F_{UL}(k,i) - h_{UL}(k,i)\|_2^2 \quad \text{Formula 7}$$

In other words, in this scenario, the model parameter conforms to the following expression:

$$\begin{cases} \{\text{model parameter}\} = \underset{\{\text{model parameter}\}}{\arg\min} \|F_{UL}(k,i) - h_{UL}(k,i)\|_2^2 \\ F_{UL}(k,i|\lambda) = F(k,i|\lambda_{UL}) \end{cases} \quad \text{Formula 8}$$

where arg min represents a variable when an objective function is solved to obtain a minimum value, i represents the number of a subcarrier frequency, k represents the number of an array element, λ represents a wavelength corresponding to a subcarrier frequency, $\lambda_{UL}$ represents a wavelength corresponding to an uplink subcarrier frequency, $F_{UL}$ represents an uplink channel frequency response mathematical model, F represents the channel frequency response mathematical model, and $h_{UL}$ represents an uplink channel frequency response.

$F_{UL}(k,i|\lambda)=F(k,i|\lambda_{UL})$ may indicate that, the uplink channel frequency response mathematical model is an expression obtained by substituting a wavelength $\lambda_{UL}$ corresponding to each uplink subcarrier frequency into the channel frequency response mathematical model.

The optimization problem shown in Formula 7 may be solved through the following steps:

(1) Formula 4 is written in a matrix form:

$$B = \begin{bmatrix} a_1 e^{j\phi_1} & a_2 e^{j\phi_2} & \dots & a_N e^{j\phi_N} \end{bmatrix}^T \quad \text{Formula 9}$$

$$D_{UL,i} = \begin{bmatrix} e^{-j\frac{2\pi}{\lambda_{UL,i}}d_1} & & & \\ & e^{-j\frac{2\pi}{\lambda_{UL,i}}d_2} & & \\ & & \dots & \\ & & & e^{-j\frac{2\pi}{\lambda_{UL,i}}d_N} \end{bmatrix} \quad \text{Formula 10}$$

$$Z_{UL,i} = \begin{bmatrix} e^{-j\frac{2\pi}{\lambda_{UL,i}}l\cos\theta_1} & e^{-j\frac{2\pi}{\lambda_{UL,i}}l\cos\theta_2} & \dots & e^{-j\frac{2\pi}{\lambda_{UL,i}}l\cos\theta_N} \\ e^{-j\frac{2\pi}{\lambda_{UL,i}}2l\cos\theta_1} & e^{-j\frac{2\pi}{\lambda_{UL,i}}2l\cos\theta_2} & \dots & e^{-j\frac{2\pi}{\lambda_{UL,i}}2l\cos\theta_N} \\ \dots & \dots & \dots & \dots \\ e^{-j\frac{2\pi}{\lambda_{UL,i}}Kl\cos\theta_1} & e^{-j\frac{2\pi}{\lambda_{UL,i}}Kl\cos\theta_2} & \dots & e^{-j\frac{2\pi}{\lambda_{UL,i}}Kl\cos\theta_N} \end{bmatrix} \quad \text{Formula 11}$$

$$H_{UL,i} = \begin{bmatrix} h_{UL}(1,i) \\ h_{UL}(2,i) \\ \dots \\ h_{UL}(K,i) \end{bmatrix} \quad \text{Formula 12}$$

Then Formula 4 may be represented by a matrix as follows:

$$H_{UL,i} = Z_i D_i B \quad \text{Formula 13}$$

Further, $$G_{UL} = \begin{bmatrix} H_{UL,1} \\ H_{UL,2} \\ \dots \\ H_{UL,I} \end{bmatrix} \quad \text{Formula 14}$$

$$Y_{UL} = \begin{bmatrix} Z_{UL,1} D_{UL,1} \\ Z_{UL,2} D_{UL,2} \\ \dots \\ Z_{UL,I} D_{UL,I} \end{bmatrix} \quad \text{Formula 15}$$

In combination with Formula 13 corresponding to I uplink subcarrier frequencies, an overall uplink channel frequency response mathematical model of full bandwidth may be represented as follows:

$$G_{UL} = Y_{UL} B \qquad \text{Formula 16}$$

(2) Based on the matrix form represented by Formula 16, the optimization problem shown in Formula 7 may be represented as follows:

$$\{\hat{d}_n^*, \hat{\theta}_n^*, \hat{a}_n^*, \hat{\phi}_n^*\}_{n=1}^N = \operatorname*{arg\,min}_{\{\hat{d}_n, \hat{\theta}_n, \hat{a}_n^+, \hat{A}_n^+, \hat{a}_n^-, \hat{A}_n^-\}_{n=1}^N} \|G_{UL} - \hat{G}_{UL}\|_2^2 = \qquad \text{Formula 17}$$

$$\operatorname*{arg\,min}_{\{\hat{d}_n, \hat{\theta}_n, \hat{a}_n^+, \hat{A}_n^+, \hat{a}_n^-, \hat{A}_n^-\}_{n=1}^N} \|G_{UL} - \hat{Y}_{UL}\hat{B}\|_2^2$$

When $\hat{Y}_{UL}$ is fixed, an optimization problem of $\hat{B}$ is transformed into a linear programming problem. In this case, an optimal solution may be represented as follows:

$$\hat{B} = \hat{Y}_{UL}^\dagger G_{UL} \qquad \text{Formula 18}$$

where $\hat{Y}_{UL}^\dagger$ represents a pseudo-inverse of $\hat{Y}_{UL}$.

(3) The optimization problem in Formula 17 may be transformed into an optimization problem related only to $\hat{Y}_{UL}$ that is related only to $\{\hat{d}_n, \hat{\theta}_n\}_{n=1}^N$:

$$\{\hat{d}_n^*, \hat{\theta}_n^*\}_{n=1}^N = \operatorname*{arg\,min}_{\{\hat{d}_n^*, \hat{\theta}_n^*\}_{n=1}^N} \|G_{UL} - \hat{Y}_{UL}(\hat{d}_n, \hat{\theta}_n)\hat{Y}_{UL}^\dagger(\hat{d}_n, \hat{\theta}_n) G_{UL}\|_2^2 \qquad \text{Formula 19}$$

In other words, a 4N-dimensional optimization problem in Formula 17 may be transformed into a 2N-dimensional optimization problem in Formula 19 through element elimination, thereby reducing calculation complexity, so that a calculation process is simpler.

(4) For the optimization problem in Formula 19, a peak may be determined by using a simplex method (for example, a Nelder-Mead method Nelder-Mead method), to obtain optimal $\{\hat{d}_n^*, \hat{\theta}_n^*\}_{n=1}^N$. $\hat{d}_n^*$ and $\hat{\theta}_n^*$ obtained herein are the target values of the model parameters $d_n$ and $\theta_n$.

After the optimal $\{\hat{d}_n, \hat{\theta}_n\}_{n=1}^N$ is obtained in step 402, in step 3023, the access network device may calculate optimal $\{\hat{a}_n^*, \hat{\phi}_n^*\}_{n=1}^N$ based on the optimal $\{\hat{d}_n^*, \hat{\theta}_n^*\}_{n=1}^N$ by using Formula 18:

$$B^* = [a_1^* e^{j\phi_1^*} \ a_2^* e^{j\phi_2^*} \ \ldots \ a_N^* e^{j\phi_N^*}]^T = \hat{Y}_{UL}^\dagger (\hat{d}_n^*, \hat{\theta}_n^*) G_{UL} \qquad \text{Formula 20}$$

$a_n^*$ and $\phi_n^*$ obtained herein are the target values of the model parameters $a_n$ and $\phi_n$.

So far, the model parameters $d_n$, $\theta_n$, $a_n$, and $\phi_n$ are solved.

The foregoing description is mainly provided by using Manner A in the first possible implementation of solving the model parameter as an example. For Manner B in the first possible implementation, because the initial value of $d_n$ and the initial value of $\theta_n$ are solutions obtained by searching, through traversal, on the mesh points obtained by dividing the parameter space, for peaks of the target likelihood spectrum, and may not be optimal solutions, that is, a peak corresponding to a mesh point may not be a peak of the entire target likelihood spectrum, in step 502, the access network device may further search, through traversal, for peaks that are on the target likelihood spectrum and that are near the initial value, that is, peaks corresponding to locations near the mesh points, to obtain the target value of $d_n$ and the target value of 0, so that the target value of $a_n$ and the target value of $d_n$ may be obtained by using Formula 18.

In addition, for the second possible implementation of solving the model parameter, the access network device may not solve the initial value of $d_n$ and the initial value of $\theta_n$ by using the target likelihood spectrum, but directly solves the target value of $d_n$, the target value of $\theta_n$, the target value of $a_n$, and the target value of $\phi_n$ based on an optimization objective function shown in Formula 17 by using the optimization algorithm (for example, a maximum likelihood method). In this manner, entire parameter space is searched for a peak, so that an obtained model parameter is more accurate.

After obtaining the target values of the model parameters $d_n$, $\theta_n$, $a_n$, and $\phi_n$, in step 303, the access network device may construct a downlink channel frequency response mathematical model $F_{DL}(k,i)$ based on the model parameters, the channel frequency response mathematical model, and each downlink subcarrier frequency. $F_{DL}(k,i)$ is a downlink channel frequency response $h_{DL}(k,i)$ constructed by the access network device:

$$h_{DL}(k, i) = F_{DL}(k, i) = \sum_{n=1}^{N} a_n^* e^{j\phi_n^*} e^{-j\frac{2\pi}{\lambda_{DL,i}} d_n^*} e^{-j\frac{2\pi}{\lambda_{DL,i}} k l \cos\theta_n^*} \qquad \text{Formula 21}$$

It should be noted that, $h_{DL}(k,i)$ herein is a downlink channel frequency response reconstructed based on the model parameters and the channel frequency response mathematical model, rather than a true downlink channel frequency response.

In step 304, the access network device may obtain, based on the constructed downlink channel frequency response, an optimal beamforming weight that is shown in Formula 1 and that corresponds to each downlink subcarrier frequency.

After obtaining the beamforming weight, in step 305, the access network device may perform downlink beamforming on the antenna array based on the weight, and then send a signal.

It can be learned that, according to the beamforming method provided in this embodiment of this application, in the single polarization scenario, the downlink channel frequency response may be constructed to calculate the beamforming weight for beamforming.

Scenario 2: Dual-Polarized Antenna Array Scenario

Figure 5:
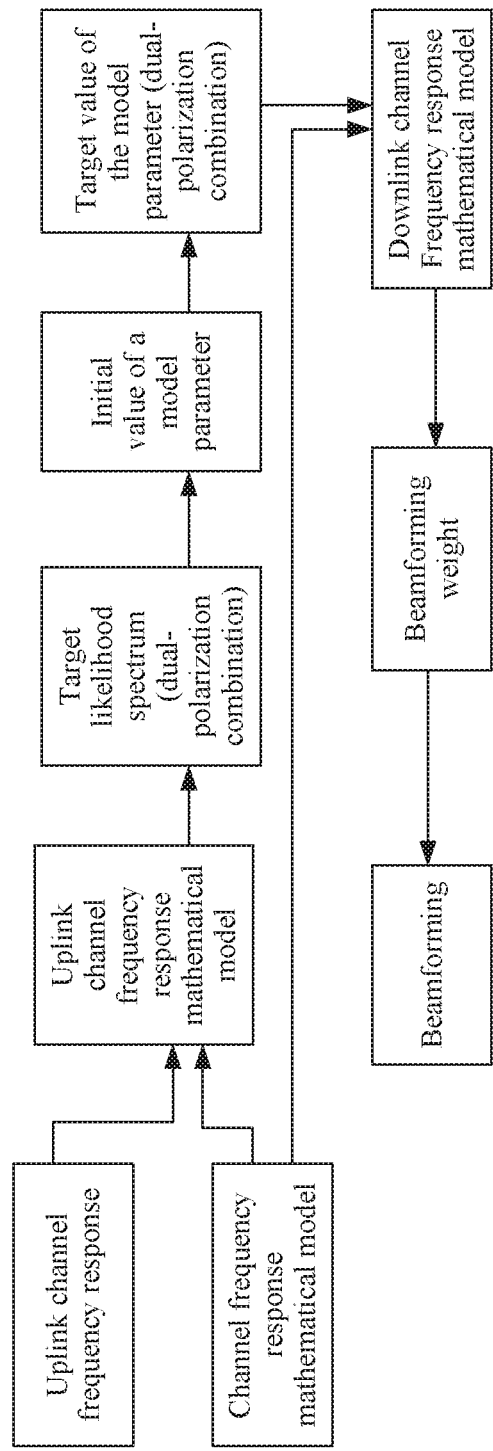
FIG. 5 is a flowchart of another beamforming method according to an embodiment of this application.

For a flowchart of a beamforming method corresponding to this scenario, refer to FIG. 5. In this scenario, because each array element in the dual-polarized antenna array may correspond to two polarization directions, the access network device may reconstruct a downlink channel frequency response in combination with channel features respectively corresponding to the two polarization directions, to perform beamforming. A specific process is as follows:

The access network device may obtain, through calculation, the uplink channel frequency response in step 301. The uplink channel frequency response may include a first polarization uplink channel frequency response $h_{UL}^+(k,i)$ and a second polarization uplink channel frequency response $h_{UL}^-(k,i)$ Based on each uplink subcarrier frequency and the channel frequency response mathematical model, $h_{UL}^+(k,i)$ may be represented by a first polarization uplink channel frequency response mathematical model $F_{UL}^+(k,i)$ shown in Formula 22, and $h_{UL}^-(k,i)$ may be represented by a second polarization uplink channel frequency response mathematical model $F_{UL}^-(k,i)$ shown in Formula 23:

$$h_{UL}^+(k, i) = F_{UL}^+(k, i) = \sum_{n=1}^{N} a_n^+ e^{j\phi_n^+} e^{-j\frac{2\pi}{\lambda_{UL,i}} d_n} e^{-j\frac{2\pi}{\lambda_{UL,i}} kl\cos\theta_n}$$ Formula 22

$$h_{UL}^-(k, i) = F_{UL}^-(k, i) = \sum_{n=1}^{N} a_n^- e^{j\phi_n^-} e^{-j\frac{2\pi}{\lambda_{UL,i}} d_n} e^{-j\frac{2\pi}{\lambda_{UL,i}} kl\cos\theta_n}$$ Formula 23 where i=1, 2, . . . , I represents the number of a subcarrier frequency, I represents the quantity of subcarrier frequencies, k=1, 2, . . . , K represents the number of an array element, K represents the quantity of array elements, l represents the array element spacing, n=1, 2, . . . , N represents a number of a path, N represents a quantity of paths, $d_n$ represents a distance of an $n^{th}$ path, $\theta_n$ represents an angle of arrival of the $n^{th}$ path, $a_n^+$ represents an amplitude, corresponding to the first polarization, of the $n^{th}$ path, $a_n^-$ represents an amplitude, corresponding to the second polarization, of the $n^{th}$ path, $\phi_n^-$ represents an initial phase, corresponding to the first polarization, of the $n^{th}$ path, $\phi_n^-$ represents an initial phase, corresponding to the second polarization, of the $n^{th}$ path, and $\lambda_{UL,i}$ represents a wavelength corresponding to an $i^{th}$ uplink subcarrier frequency.

That the access network device constructs a target likelihood spectrum of the uplink channel frequency response based on the uplink channel frequency response and each uplink subcarrier frequency in step 3021 may include:

The access network device constructs a first polarization likelihood spectrum of the uplink channel frequency response based on the first polarization uplink channel frequency response and each uplink subcarrier frequency; and the access network device constructs a second polarization likelihood spectrum of the uplink channel frequency response based on the second polarization uplink channel frequency response and each uplink subcarrier frequency, where a sum of the first polarization likelihood spectrum and the second polarization likelihood spectrum is the target likelihood spectrum.

For forms of the first polarization likelihood spectrum and the second polarization likelihood spectrum, refer to Formula 4. Specifically, for an expression of the first polarization likelihood spectrum $\Theta^+(d,\theta)$, refer to the following Formula 24: for an expression of the second polarization likelihood spectrum $\Theta^-(d,\theta)$, refer to the following Formula 25; and for an expression of the target likelihood spectrum $\Theta^{DP}(d,\theta)$ obtained after adding up the first polarization likelihood spectrum and the second polarization likelihood spectrum, refer to the following Formula 26:

$$\Theta^+(d, \theta) = \left\| \sum_{i=1}^{I} \sum_{k=1}^{K} h_{UL}^+(k, i) e^{j\frac{2\pi}{\lambda_{UL,i}} d} e^{j\frac{2\pi}{\lambda_{UL,i}} kl\cos\theta} \right\|_2^2$$ Formula 24

$$\Theta^-(d, \theta) = \left\| \sum_{i=1}^{I} \sum_{k=1}^{K} h_{UL}^-(k, i) e^{j\frac{2\pi}{\lambda_{UL,i}} d} e^{j\frac{2\pi}{\lambda_{UL,i}} kl\cos\theta} \right\|_2^2$$ Formula 25

$$\Theta^{DP}(d, \theta) = \Theta^+(d, \theta) + \Theta^-(d, \theta) =$$ Formula 26

$$\left\| \sum_{i=1}^{I} \sum_{k=1}^{K} h_{UL}^+(k, i) e^{j\frac{2\pi}{\lambda_{UL,i}} d} e^{j\frac{2\pi}{\lambda_{UL,i}} kl\cos\theta} \right\|_2^2 +$$

$$\left\| \sum_{i=1}^{I} \sum_{k=1}^{K} h_{UL}^-(k, i) e^{j\frac{2\pi}{\lambda_{UL,i}} d} e^{j\frac{2\pi}{\lambda_{UL,i}} kl\cos\theta} \right\|_2^2$$

After obtaining the target likelihood spectrum shown in Formula 26, the access network device may calculate the initial value of the distance of each path and the initial value of the angle of arrival of each path in step 401 or step 501 based on the target likelihood spectrum. This is similar to that in the single polarization scenario.

Specifically, parameter space corresponding to the target likelihood spectrum shown in Formula 26 may be divided into a plurality of mesh points, and the access network device may search, through traversal, on the mesh points for peaks by using the search algorithm, to estimate the initial value of the distance $d_n$ of each path and the initial value of the angle $\theta_n$ of arrival of each path.

It should be noted that, because the likelihood spectrums shown in Formula 24 and Formula 25 are spatial spectrums formed through conjugate compensation for a steering vector and coherent accumulation, a true value may be highlighted on the target likelihood spectrum as a spectrum peak. In addition, because the model parameters $d_n$ and $\theta_n$ are the same in the dual-polarization scenario, dual-polarization likelihood spectrums (the first polarization likelihood spectrum and the second polarization likelihood spectrum) may be added up, to be combined into an overall target likelihood spectrum, so that the initial value of $d_n$ and the initial value of $\theta_n$ are jointly estimated based on the overall target likelihood spectrum. Because in the dual-polarization scenario, for an unwanted signal such as noise, when the signal corresponds to a peak on the first polarization likelihood spectrum, the signal may not correspond to a peak on the second polarization likelihood spectrum, for example, may correspond to a valley; and for a wanted signal, when the signal corresponds to a peak on the first polarization likelihood spectrum, the signal also corresponds to a peak on the second polarization likelihood spectrum, by adding up the dual-polarization likelihood spectrums, spectrum peaks formed on the target likelihood spectrum by a plurality of true paths can be more highlighted, and pseudo peaks formed on the target likelihood spectrum by interference such as noise are relatively suppressed, thereby reducing a quantity of iterations, and helping more simply, efficiently, and accurately determine the initial values of $d_n$ and $\theta_n$ in the dual-polarization scenario.

After obtaining the initial value of the distance of each path and the initial value of the angle of arrival of each path, in step 402, the access network device may substitute the obtained initial values of $d_n$ and $\theta_n$ into a subsequent optimum solving process for further accurate estimation, and the amplitude $a_n$ of each path and the initial phase $\phi_n$ of each path are represented by $d_n$ and $\theta_n$ through element elimination. In this way, an optimal value of $d_n$ and an optimal value of $\theta_n$, namely, the target value of $d_n$ and the target value of $\theta_n$, are first calculated, and then an optimal value of $a_n$ and an optimal value of $\theta_n$, namely, the target value of $\phi_n$ and the target value of $d_n$, are calculated.

It should be noted that, in the dual-polarization scenario, the amplitude $a_n$ of each path includes an amplitude $a_n^+$, corresponding to the first polarization, of each path and an amplitude $a_n^-$, corresponding to the second polarization, of each path, and the initial phase $\phi_n$ of each path includes an initial phase $\phi_n^+$, corresponding to the first polarization, of each path and an initial phase $\phi_n^-$, corresponding to the second polarization, of each path. Correspondingly, the target value of the amplitude of each path also includes a target value of the amplitude, corresponding to the first polarization, of each path and a target value of the amplitude, corresponding to the second polarization, of each path; and the target value of the initial phase of each path also includes a target value of the initial phase, corresponding to the first polarization, of each path and a target value of the initial phase, corresponding to the second polarization, of each path.

A process of solving the model parameter by using the optimization algorithm may be specifically as follows:

It can be learned from Formula 22 and Formula 23 that, for each estimated parameter value group $\{\hat{d}_n, \hat{\theta}_n, \hat{a}_n, \hat{\phi}_n\}_{n=1}^{N}$, a pair of dual-polarization uplink channel frequency response mathematical models may be constructed based on the channel frequency response model: a first polarization uplink channel frequency response mathematical model $F'_{UL}{}^+(k,i)$ and a second polarization uplink channel frequency response mathematical model $F'_{UL}{}^-(k,i)$.

$$F'^+_{UL}(k, i) = \sum_{n=1}^{N} \hat{a}_n^+ e^{j\hat{\phi}_n^+} e^{-j\frac{2\pi}{\lambda_{UL,i}}\hat{d}_n} e^{-j\frac{2\pi}{\lambda_{UL,i}}k l \cos\hat{\theta}_n} \quad \text{Formula 27}$$

$$F'^-_{UL}(k, i) = \sum_{n=1}^{N} \hat{a}_n^- e^{j\hat{\phi}_n^-} e^{-j\frac{2\pi}{\lambda_{UL,i}}\hat{d}_n} e^{-j\frac{2\pi}{\lambda_{UL,i}}k l \cos\hat{\theta}_n} \quad \text{Formula 28}$$

where $F'_{UL}{}^+(k,i)$ represents the first polarization uplink channel frequency response mathematical model $F'_{UL}{}^+(k,i)$ corresponding to the estimated model parameter value group $\{\hat{d}_n^*, \hat{\theta}_n^*, \hat{a}_n^{+,*}, \hat{\phi}_n^{+,*}\}_{n=1}^{N}$; and $F'_{UL}{}^-(k,i)$ represents the second polarization uplink channel frequency response mathematical model $F'_{UL}{}^+(k,i)$ corresponding to the estimated model parameter value group $\{\hat{d}_n^*, \hat{\theta}_n^*, \hat{a}_n^{-,*}, \hat{\phi}_n^{-,*}\}_{n=1}^{N}$.

An optimal estimated model parameter value $\{\hat{d}_n^*, \hat{\theta}_n^*, \hat{a}_n^{+,*}, \hat{\phi}_n^{+,*}, \hat{a}_n^{-,*}, \hat{\phi}_n^{-,*}\}_{n=1}^{N}$ makes $F_{UL}{}^+(k,i)$ closest to true $h_{UL}{}^+(k,i)$ obtained through calculation in step 301, and makes $F_{UL}{}^-(k,i)$ closest to true $h_{UL}{}^-(k,i)$ obtained through calculation in step 301. Therefore, a model parameter estimation problem may be transformed into an optimization problem shown in Formula 29:

$$\{\hat{d}_n^*, \hat{\theta}_n^*, \hat{a}_n^{+,*}, \hat{\phi}_n^{+,*}, \hat{a}_n^{-,*}, \hat{\phi}_n^{-,*}\}_{n=1}^{N} = \quad \text{Formula 29}$$
$$\underset{\{\hat{d}_n, \hat{\theta}_n, \hat{a}_n^+, \hat{\phi}_n^+, \hat{a}_n^-, \hat{\phi}_n^-\}_{n=1}^{N}}{\arg\min} \|F^+_{UL}(k, i) - h^+_{UL}(k, i)\|_2^2 +$$
$$\|F^-_{UL}(k, i) - h^-_{UL}(k, i)\|_2^2$$

In other words, in this scenario, the model parameter conforms to the following expression:

$$\begin{cases} \{\text{model parameter}\} = \underset{\{\text{model parameter}\}}{\arg\min} & \text{Formula 30} \\ \|F^+_{UL}(k, i) - h^+_{UL}(k, i)\|_2^2 + \|F^-_{UL}(k, i) - h^-_{UL}(k, i)\|_2^2 \\ F^+_{UL}(k, i | \lambda, \text{ model parameter}) = \\ F(k, i | \lambda_{UL}, \text{ first polarization model parameter}) \\ F^-_{UL}(k, i | \lambda, \text{ model parameter}) = \\ F(k, i | \lambda_{UL}, \text{ second polarization model parameter}) \end{cases}$$

where in Formula 30, arg min represents a variable when an objective function is solved to obtain a minimum value, i represents the number of a subcarrier frequency, k represents the number of an array element, λ represents a wavelength corresponding to a subcarrier frequency, $\lambda_{UL}$ represents a wavelength corresponding to an uplink subcarrier frequency, $F_{UL}{}^+$ represents the first polarization uplink channel frequency response mathematical model, $F_{UL}{}^-$ represents the second polarization uplink channel frequency response mathematical model, F represents the channel frequency response mathematical model, $h_{UL}{}^+$ represents the first polarization uplink channel frequency response, and $h_{UL}{}^-$ represents the second polarization uplink channel frequency response.

A first polarization model parameter may include an amplitude, corresponding to the first polarization, of each path and an initial phase, corresponding to the first polarization, of each path, and a second polarization model parameter may include an amplitude, corresponding to the second polarization, of each path and an initial phase, corresponding to the second polarization, of each path.

$F_{UL}{}^+(k,i|\lambda,$ model parameter$)=F(k,i|\lambda_{UL},$ first polarization model parameter$)$ may indicate that, the first polarization uplink channel frequency response mathematical model is an expression obtained by substituting the wavelength $\lambda_{UL}$ corresponding to each uplink subcarrier frequency and the first polarization model parameter into the channel frequency response mathematical model.

$F_{UL}{}^-(k,i|\lambda,$ model parameter$)=F(k,i|\lambda_{UL},$ second polarization model parameter$)$ may indicate that, the second polarization uplink channel frequency response mathematical model is an expression obtained by substituting the wavelength L corresponding to each uplink subcarrier frequency and the second polarization model parameter into the channel frequency response mathematical model.

It should be noted that, when the access network device combines dual-polarization optimization objective functions shown in Formula 27 and Formula 28 into an optimization objective function shown in Formula 29 to perform joint optimum solving, because in the dual-polarization scenario, for an unwanted signal such as noise, when the signal corresponds to a peak on the first polarization optimization objective function, the signal may not correspond to a peak on the second polarization optimization objective function, for example, may correspond to a valley; and for a wanted signal, when the signal corresponds to a peak on the first polarization optimization objective function, the signal also corresponds to a peak on the second polarization optimization objective function, by adding up the dual-polarization optimization objective functions, peaks formed on the optimization objective function by a plurality of true paths can be more highlighted, and pseudo peaks formed on the optimization objective function by interference such as noise are relatively suppressed, thereby reducing a quantity of iterations, and helping more simply, efficiently, and accurately determine the model parameter in the dual-polarization scenario.

The optimization problem shown in Formula 29 may be solved through the following steps:

(1) Formula 22 and Formula 23 each are written in a matrix form:

$$B^+ = \begin{bmatrix} a_1^+ e^{j\phi_1^+} & a_2^+ e^{j\phi_2^+} & \ldots & a_N^+ e^{j\phi_N^+} \end{bmatrix}^T \quad \text{Formula 31}$$

$$B^- = \begin{bmatrix} a_1^- e^{j\phi_1^-} & a_2^- e^{j\phi_2^-} & \ldots & a_N^- e^{j\phi_N^-} \end{bmatrix}^T \quad \text{Formula 32}$$

$$D_{UL,i} = \begin{bmatrix} e^{-j\frac{2\pi}{\lambda_{UL,i}}d_1} & & & \\ & e^{-j\frac{2\pi}{\lambda_{UL,i}}d_2} & & \\ & & \ldots & \\ & & & e^{-j\frac{2\pi}{\lambda_{UL,i}}d_N} \end{bmatrix} \quad \text{Formula 33}$$

$$Z_{UL,i} = \begin{bmatrix} e^{-j\frac{2\pi}{\lambda_{UL,i}}l\cos\theta_1} & e^{-j\frac{2\pi}{\lambda_{UL,i}}l\cos\theta_2} & \ldots & e^{-j\frac{2\pi}{\lambda_{UL,i}}l\cos\theta_N} \\ e^{-j\frac{2\pi}{\lambda_{UL,i}}2l\cos\theta_1} & e^{-j\frac{2\pi}{\lambda_{UL,i}}2l\cos\theta_2} & \ldots & e^{-j\frac{2\pi}{\lambda_{UL,i}}2l\cos\theta_N} \\ \ldots & \ldots & \ldots & \ldots \\ e^{-j\frac{2\pi}{\lambda_{UL,i}}Kl\cos\theta_1} & e^{-j\frac{2\pi}{\lambda_{UL,i}}Kl\cos\theta_2} & \ldots & e^{-j\frac{2\pi}{\lambda_{UL,i}}Kl\cos\theta_N} \end{bmatrix} \quad \text{Formula 34}$$

$$H_{UL,i}^+ = \begin{bmatrix} h_{UL}^+(1,i) \\ h_{UL}^+(2,i) \\ \ldots \\ h_{UL}^+(K,i) \end{bmatrix} \quad \text{Formula 35}$$

$$H_{UL,i}^- = \begin{bmatrix} h_{UL}^-(1,i) \\ h_{UL}^-(2,i) \\ \ldots \\ h_{UL}^-(K,i) \end{bmatrix} \quad \text{Formula 36}$$

Then Formula 22 and Formula 23 may be represented by matrices as follows:

$$H_{UL}^+ = Z_i D_i B^+ \quad \text{Formula 37}$$

$$H_{UL}^- = Z_i D_i B^- \quad \text{Formula 38}$$

Further, $$G_{UL}^+ = \begin{bmatrix} H_{UL,1}^+ \\ H_{UL,2}^+ \\ \ldots \\ H_{UL,I}^+ \end{bmatrix} \quad \text{Formula 39}$$

$$G_{UL}^- = \begin{bmatrix} H_{UL,1}^- \\ H_{UL,2}^- \\ \ldots \\ H_{UL,I}^- \end{bmatrix} \quad \text{Formula 40}$$

$$Y_{UL} = \begin{bmatrix} Z_{UL,1}D_{UL,1} \\ Z_{UL,2}D_{UL,2} \\ \ldots \\ Z_{UL,I}D_{UL,I} \end{bmatrix} \quad \text{Formula 41}$$

In combination with Formula 37 and Formula 38 corresponding to I uplink subcarrier frequencies, overall uplink channel frequency response mathematical models of full bandwidth may be represented as follows:

$$G_{UL}^+ = Y_{UL}B^+ \quad \text{Formula 42}$$

$$G_{UL}^- = Y_{UL}B^- \quad \text{Formula 43}$$

(2) Based on the matrix forms represented by Formula 42 and Formula 43, the optimization problem shown in Formula 29 may be represented as follows:

$$\{\hat{d}_n^*, \hat{\theta}_n^*, \hat{a}_n^{+,*}, \hat{\phi}_n^{+,*}, \hat{a}_n^{-,*}, \hat{\phi}_n^{-,*}\}_{n=1}^N = \quad \text{Formula 44}$$

$$\arg\min_{\{\hat{d}_n, \hat{\theta}_n, \hat{a}_n^+, \hat{\phi}_n^+, \hat{a}_n^-, \hat{\phi}_n^-\}_{n=1}^N} \|G_{UL}^+ - \hat{G}_{UL}^+\|_2^2 + \|G_{UL}^- - \hat{G}_{UL}^-\|_2^2 =$$

$$\arg\min_{\{\hat{d}_n, \hat{\theta}_n, \hat{a}_n^+, \hat{\phi}_n^+, \hat{a}_n^-, \hat{\phi}_n^-\}_{n=1}^N} \|G_{UL}^+ - \hat{Y}_{UL}\hat{B}^+\|_2^2 + \|G_{UL}^- - \hat{Y}_{UL}\hat{B}^-\|_2^2$$

When $\hat{B}^+$ is fixed, an optimization problem of $\hat{B}^+$ and $\hat{B}^-$ is transformed into a linear programming problem. In this case, an optimal solution may be represented as follows:

$$\hat{B}^+ = \hat{Y}_{UL}^\dagger G_{UL}^+ \quad \text{Formula 45}$$

$$\hat{B}^- = \hat{Y}_{UL}^\dagger G_{UL}^- \quad \text{Formula 46}$$

where $\hat{Y}_{UL}^\dagger$ represents a pseudo-inverse of $\hat{Y}_{UL}$.

(3) The optimization problem in Formula 44 may be transformed into an optimization problem related only to $\hat{Y}_{UL}$, that is, related only to $\{\hat{d}_n, \hat{\theta}_n\}_{n=1}^N$:

$$\{\hat{d}_n^*, \hat{\theta}_n^*\}_{n=1}^N = \arg\min_{\{\hat{d}_n, \hat{\theta}_n\}_{n=1}^N} \|G_{UL}^+ - \hat{Y}_{UL}(\hat{d}_n, \hat{\theta}_n)\hat{Y}_{UL}^\dagger(\hat{d}_n, \hat{\theta}_n)G_{UL}^+\|_2^2 + \quad \text{Formula 47}$$

$$\|G_{UL}^- - \hat{Y}_{UL}(\hat{d}_n, \hat{\theta}_n)\hat{Y}_{UL}^\dagger(\hat{d}_n, \hat{\theta}_n)G_{UL}^-\|_2^2$$

In other words, a 6N-dimensional optimization problem in Formula 44 may be transformed into a 2N-dimensional optimization problem in Formula 47 through element elimination, thereby reducing calculation complexity, so that a calculation process is simpler.

(4) For the optimization problem in Formula 47, a simplex method (for example, a Nelder-Mead method Nelder-Mead method) may be used for search, to obtain optimal $\{\hat{d}_n^*, \hat{\theta}_n^*\}_{n=1}^N$. $\hat{d}_n^*$ and $\hat{\theta}_n^*$ obtained herein are the target values of the model parameters $d_n$ and $\theta_n$.

After the optimal $\{\hat{d}_n^*, \hat{\theta}_n^*\}_{n=1}^N$ is obtained in step 402, in step 3023, the access network device may calculate optimal $\{\hat{a}_n^{+,*}, \hat{\phi}_n^{+,*}, \hat{a}_n^{-,*}, \hat{\phi}_n^{-,*}\}_{n=1}^N$ based on the optimal $\{\hat{d}_n^*, \hat{\theta}_n^*\}_{n=1}^N$ by using Formula 45 and Formula 46:

$$\hat{B}^{+,*} = [a_1^{+,*}e^{j\phi_1^{+,*}} \ a_2^{+,*}e^{j\phi_2^{+,*}} \ldots a_N^{+,*}e^{j\phi_N^{+,*}}]^T = \hat{Y}_{UL}^\dagger(\hat{d}_n^*, \hat{\theta}_n^*)G_{UL}^+ \quad \text{Formula 48}$$

$$\hat{B}^{-,*} = [a_1^{-,*}e^{j\phi_1^{-,*}} \ a_2^{-,*}e^{j\phi_2^{-,*}} \ldots a_N^{-,*}e^{j\phi_N^{-,*}}]^T = \hat{Y}_{UL}^\dagger(\hat{d}_n^*, \hat{\theta}_n^*)G_{UL}^- \quad \text{Formula 20}$$

$\hat{a}_n^{+,*}$, $\hat{\phi}_n^{+,*}$, $\hat{a}_n^{-,*}$, and $\hat{\phi}_n^{-,*}$ obtained herein are the target values of the model parameters $\hat{a}_n^{+,*}$, $\hat{\phi}_n^{+,*}$, $\hat{a}_n^{-,*}$, and $\hat{\phi}_n^-$.

So far, the model parameters $d_n$, $\theta_n$, $a_n^+$, $\phi_n^+$, $a_n^-$, and $\phi_n^-$ are solved.

The foregoing description is mainly provided by using Manner A in the first possible implementation of solving the model parameter as an example. For Manner B in the first possible implementation, similar to the single polarization scenario, because the initial value of $d_n$ and the initial value of $\theta_n$ are solutions obtained by searching, through traversal, on the mesh points obtained by dividing the parameter space, for peaks of the target likelihood spectrum, and may not be optimal solutions, that is, a peak corresponding to a mesh point may not be a peak of the entire target likelihood spectrum. Therefore, in step 502, the access network device may further search, through traversal, for peaks that are on the target likelihood spectrum and that are near the initial value, that is, peaks corresponding to locations near the mesh points, to obtain the target value of $d_n$ and the target value of $\theta_n$, so that the target value of $a_n^+$, the target value of $\phi_n^-$, the target value of $a_n^-$, and the target value of $\phi_n^-$ may be obtained by using Formula 45 and Formula 46.

In addition, similar to the single polarization scenario, for the second possible implementation of solving the model parameter, the access network device may not solve the initial value of $d_n$ and the initial value of $\theta_n$ by using the target likelihood spectrum, but directly solves the target value of $d_n$, the target value of $\theta_n$, the target value of $a_n^+$, the target value of $\phi_n^+$, the target value of $a_n^-$, and the target value of $\phi_n^-$ according to Formula 44 by using the optimization algorithm. In addition, in this manner, entire parameter space is searched through traversal, so that an obtained model parameter is more accurate.

After the target values of the model parameters $d_n$, $\theta_n$, $a_n^+$, $\phi_n^+$, $a_n^-$, and $\phi_n^-$ are obtained, in the dual-polarization scenario, that the access network device constructs a downlink channel frequency response based on the model parameter, the channel frequency response mathematical model, and each downlink subcarrier frequency in step 303 may include the following steps:

3031. The access network device constructs a first polarization downlink channel frequency response based on the distance of each path, the angle of arrival of each path, the amplitude, corresponding to the first polarization, of each path, and the initial phase, corresponding to the first polarization, of each path in the model parameters, the channel frequency response mathematical model, and each downlink subcarrier frequency.

3032. The access network device constructs a second polarization downlink channel frequency response based on the distance of each path, the angle of arrival of each path, the amplitude, corresponding to the second polarization, of each path, and the initial phase, corresponding to the second polarization, of each path in the model parameters, the channel frequency response mathematical model, and each downlink subcarrier frequency.

Specifically, the access network device may construct a first polarization downlink channel frequency response mathematical model $F_{DL}^+(k,i)$ and a second polarization downlink channel frequency response mathematical model $F_{DL}^-(k,i)$ shown below, where $F_{DL}^+(k,i)$ is a first polarization downlink channel frequency response $h_{DL}^+(k,i)$ constructed by the access network device, and $F_{DL}^-(k,i)$ is a downlink channel frequency response $h_{DL}^-(k,i)$ constructed by the access network device:

$$h_{DL}^+(k, i) = F_{DL}^+(k, i) = \sum_{n=1}^{N} \hat{a}_n^{+,*} \hat{e}^{j\hat{\phi}_n^{+,*}} e^{-j\frac{2\pi}{\lambda_{DL,i}} \hat{d}_n^*} e^{-j\frac{2\pi}{\lambda_{DL,i}} k i \cos\hat{\theta}_n^*} \quad \text{Formula 50}$$

$$h_{DL}^-(k, i) = F_{DL}^-(k, i) = \sum_{n=1}^{N} \hat{a}_n^{-,*} \hat{e}^{j\hat{\phi}_n^{-,*}} e^{-j\frac{2\pi}{\lambda_{DL,i}} \hat{d}_n^*} e^{-j\frac{2\pi}{\lambda_{DL,i}} k i \cos\hat{\theta}_n^*} \quad \text{Formula 51}$$

In the dual-polarization scenario, the beamforming weight includes a first polarization weight and a second polarization weight, and that the access network device calculates a beamforming weight of each downlink subcarrier frequency based on the downlink channel frequency response in step 304 includes the following steps:

3041. The access network device calculates a beamforming weight, corresponding to the first polarization, of each downlink subcarrier frequency based on the first polarization downlink channel frequency response.

3042. The access network device calculates a beamforming weight, corresponding to the second polarization, of each downlink subcarrier frequency based on the second polarization downlink channel frequency response.

In step 304, the access network device may separately obtain, based on the constructed first polarization downlink channel frequency response and second polarization downlink channel frequency response, a first polarization optimal beamforming weight that is shown in Formula 52 and that corresponds to each downlink subcarrier frequency and a second polarization optimal beamforming weight that is shown in Formula 53 and that corresponds to each downlink subcarrier frequency:

$$w_i^+ = \frac{[h_{DL}^+(1, i)\ h_{DL}^+(2, i)\ \ldots h_{DL}^+(k, i)\ \ldots h_{DL}^+(K, i)]^H}{\|[h_{DL}^+(1, i)\ h_{DL}^+(2, i)\ \ldots h_{DL}^+(k, i)\ \ldots h_{DL}^+(K, i)]^H\|_2} \quad \text{Formula 52}$$

$$w_i^- = \frac{[h_{DL}^-(1, i)\ h_{DL}^-(2, i)\ \ldots h_{DL}^-(k, i)\ \ldots h_{DL}^-(K, i)]^H}{\|[h_{DL}^-(1, i)\ h_{DL}^-(2, i)\ \ldots h_{DL}^-(k, i)\ \ldots h_{DL}^-(K, i)]^H\|_2} \quad \text{Formula 53}$$

After obtaining the beamforming weights, in step 305, the access network device may perform downlink beamforming on the antenna array based on the weight, and then send a signal.

It can be learned that, according to the beamforming method provided in this embodiment of this application, in the dual-polarization scenario, the dual-polarization downlink channel frequency responses may be constructed based on dual-polarization features, to calculate the beamforming weights based on the dual-polarization downlink channel frequency responses, to perform beamforming.

In addition, especially in the dual-polarization scenario, because the model parameter in the channel frequency response mathematical model provided in this embodiment of this application has reciprocity on uplink and downlink subcarrier frequencies, which is different from another mathematical model, a process of reconstructing a downlink channel is simpler.

In addition, it should be noted that, values of the model parameter in the channel frequency response mathematical model that are obtained in the two scenarios are estimated values of the channel multipath parameter, rather than actual values of the channel multipath parameter. In addition to beamforming, the model parameter and the reconstructed downlink channel frequency response may be applied to a plurality of aspects, for example:

(1) Target Positioning

Geometric inversion calculation is performed on a target based on an estimated channel multipath parameter, for example, a delay (that is, a distance of a path) or an angle of arrival, to obtain a specific location of the target in space.

(2) Uplink Coverage Enhancement

Based on channel parameter estimation and channel reconstruction, over an uplink, a channel frequency response of specific bandwidth may be used to reconstruct a channel frequency response of neighboring bandwidth, so that uplink bandwidth that can be used to send an SRS is multiplied, thereby achieving uplink coverage enhancement.

(3) Noise Reduction Based on Channel Estimation

A conventional noise reduction solution is implemented by truncating a component of a channel response tailing in a delay domain. However, because a specific multipath delay location of a channel is not known, truncation in the delay domain is inaccurate, and most noise components may still be left, and a part of a signal may be truncated. Through channel parameter estimation, the multipath delay location can be accurately known before truncation, thereby accurately removing a noise component and retaining a signal component, to achieve a more significant noise reduction effect.

The solutions provided in the embodiments of this application are mainly described above from a perspective of interaction between network elements. It may be understood that, to implement the foregoing functions, the network elements such as the access network device and the terminal include corresponding hardware structures and/or software modules for performing the functions. A person of ordinary skill in the art should easily be aware that, with reference to algorithms and steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the access network device may be divided into function modules based on the foregoing method example. For example, the function modules may be divided corresponding to the functions, or two or more functions may be integrated into one processing module. The integrated module may be implemented in a form of hardware, or may be implemented in a form of a software function module. It should be noted that, module division in the embodiments of this application is an example, and is merely logical function division. In actual implementation, another division manner may be used.

Figure 6:
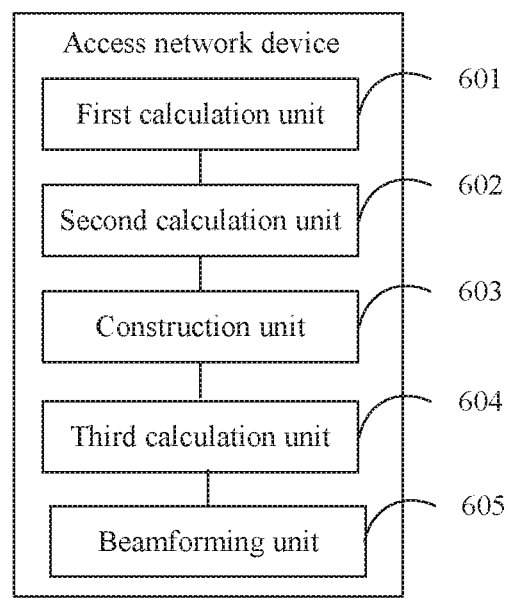
FIG. 6 is a schematic structural diagram of another access network device according to an embodiment of this application.

When the function modules are obtained through division corresponding to the functions, FIG. 6 is a possible schematic structural diagram of the access network device in the foregoing embodiment. As shown in FIG. 6, the access network device may include: a first calculation unit 601, a second calculation unit 602, a construction unit 603, a third calculation unit 604, and a beamforming unit 605.

The first calculation unit 601 is configured to support the access network device in performing step 301 in the beamforming method shown in FIG. 3. The second calculation unit 602 is configured to support the access network device in performing step 302 in FIG. 3, and the foregoing step 3021, step 3022, step 3023, step 401, step 402, step 501, and step 502. The construction unit 603 is configured to support the access network device in performing step 303 in the beamforming method shown in FIG. 3, and the foregoing step 3031 and step 3032. The third calculation unit 604 is configured to support the access network device in performing step 304 in the beamforming method shown in FIG. 3, and the foregoing step 3041 and step 3042. The beamforming unit 605 is configured to support the access network device in performing step 305 in the beamforming method shown in FIG. 3.

In this embodiment of this application, in another module division manner, as shown in FIG. 2, the access network device may include: an uplink sounding subsystem 701, a baseband subsystem 702, an intermediate radio frequency subsystem 703, and an antenna subsystem 704. A function of the first calculation unit 601 may be implemented by using the uplink sounding subsystem 701; a function of the second calculation unit 602 may be implemented by using the baseband subsystem 702; a function of the construction unit 603 may be implemented by using the baseband subsystem 702; a function of the third calculation unit 604 may be implemented by using the baseband subsystem 702 or the intermediate radio frequency subsystem 703; and a function of the beamforming unit 605 may be implemented by using the antenna subsystem 704.

It should be noted that, all related content of steps in the foregoing method embodiment may be cited in function descriptions of corresponding function modules, and details are not described herein again.

The access network device provided in this embodiment of this application is configured to perform the data processing method, and therefore can achieve the same effects as the data processing method.

Figure 7:
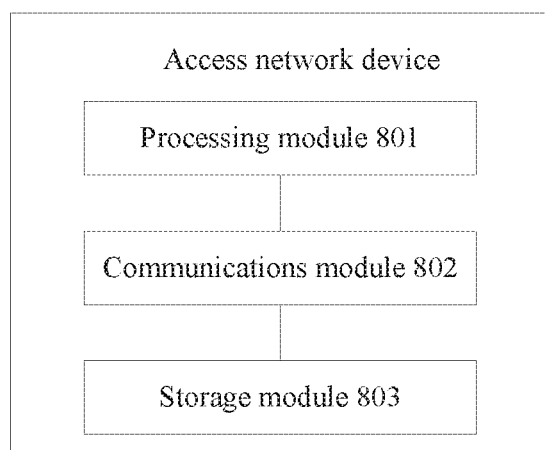
FIG. 7 is a schematic structural diagram of another access network device according to an embodiment of this application.

When an integrated module unit is used, FIG. 7 is another possible schematic structural diagram of the access network device in the foregoing embodiment. As shown in FIG. 7, the access network device includes a processing module 801 and a communications module 802.

The processing module 801 is configured to control and manage an action of the access network device. For example, the processing module 801 is configured to support the access network device in performing steps in FIG. 3, FIG. 4, and FIG. 5, and/or configured to execute another process of a technology described in this specification. The communications module 802 is configured to support the access network device in communicating with another network entity, for example, communicating with the terminal shown in FIG. 1. The access network device may further include a storage module 803, configured to store program code and data of the access network device.

The processing module 801 may be a processor or a controller. The processing module 801 may implement or execute various example logical blocks, modules, and circuits described with reference to content disclosed in this application. Alternatively, the processor may be a combination for implementing a computing function, for example, a combination of one or more microprocessors, or a combination of a DSP and a microprocessor, or the like. The communications module 802 may be a transceiver, a transceiver circuit, a communications interface, or the like. The storage module 803 may be a memory.

Figure 8:
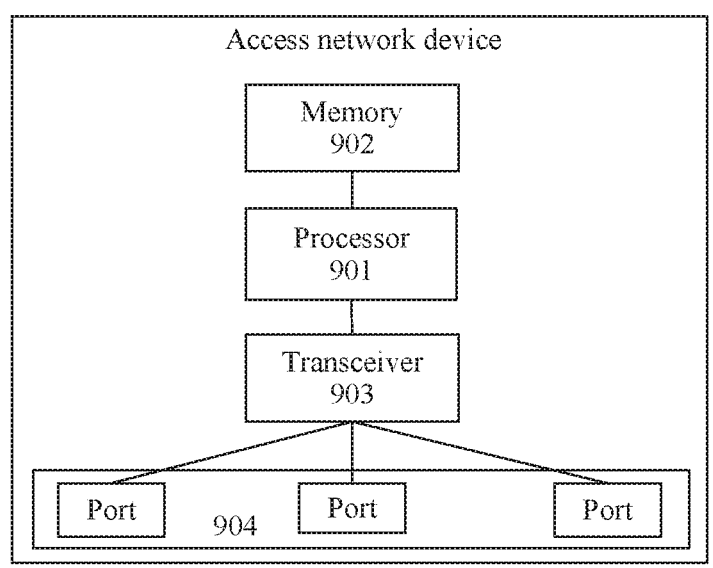
FIG. 8 is a schematic structural diagram of another access network device according to an embodiment of this application.

When the processing module 801 is the processor, the communications module 802 is the communications interface, and the storage module 803 is the memory, the access network device in this embodiment of this application may be an access network device shown in FIG. 8.

Further, the access network devices in FIG. 2 and FIG. 6 are presented in a form of a function unit. The "unit" herein may be an application-specific integrated circuit (ASIC), a processor for executing one or more software or firmware programs, a memory, an integrated logical circuit, and/or another component that can provide the foregoing function. In a simple embodiment, a person skilled in the art may figure out that the access network devices in FIG. 2 and FIG. 6 may alternatively be presented in a form shown in FIG. 8. The units may be implemented by using the processor and the memory in FIG. 8.

As shown in FIG. 8, the access network device may include one or more ports 904 coupled to a transceiver 903. The transceiver 903 may be a transmitter, a receiver, or a combination thereof, and send/receive a data packet to/from another network element through the port 904. A processor 901 is coupled to the transceiver 903 and configured to process the data packet. The processor 901 may include one or more multi-core processors and/or a memory 902. The processor 901 may be a general-purpose processor, a dedicated integrated circuit, or a digital signal processor (DSP).

The memory 902 may be a non-transitory storage medium, coupled to the processor 901, and configured to store different types of data. The memory 902 may include a read-only memory (ROM), a random access memory (RAM), or another type of dynamic storage device that can store information and instructions, or may be a magnetic disk storage.

An embodiment of the present invention further provides a computer storage medium, configured to store a computer software instruction used by the access network device shown in FIG. 2, FIG. 6, FIG. 7, or FIG. 8, including a program designed to perform the foregoing method embodiment. Beamforming may be implemented by executing the stored program.

An embodiment of this application further provides a computer program product including an instruction. When the instruction is run on a computer, the computer performs the beamforming method provided in the foregoing method embodiment.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another system or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a ROM, a random access memory RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A beamforming method, comprising:
    calculating, by an access network device, an uplink channel frequency response based on an uplink signal received from a terminal;
    calculating, by the access network device, a model parameter in a channel frequency response mathematical model based on the uplink channel frequency response and each uplink subcarrier frequency, wherein the model parameter has reciprocity on uplink and downlink subcarrier frequencies;
    constructing, by the access network device, a downlink channel frequency response based on the model parameter, the channel frequency response mathematical model, and each downlink subcarrier frequency;
    calculating, by the access network device, a beamforming weight for each downlink subcarrier frequency based on the downlink channel frequency response; and
    performing, by the access network device, downlink beamforming on an antenna array based on the beamforming weight for each downlink subcarrier frequency, wherein the antenna array is a dual-polarized antenna array or a single-polarized antenna array, and wherein the antenna array is used by the access network device to communicate with the terminal.

2. The method according to claim 1, wherein the model parameter comprises a distance of each path, an angle of arrival of each path, an amplitude of each path, and an initial phase of each path.

3. The method according to claim 2, wherein the calculating a model parameter in a channel frequency response mathematical model based on the uplink channel frequency response and each uplink subcarrier frequency comprises:
    constructing a target likelihood spectrum of the uplink channel frequency response based on the uplink channel frequency response and each uplink subcarrier frequency;
    calculating a target value of the distance of each path and a target value of the angle of arrival of each path based on the target likelihood spectrum; and
    calculating a target value of the amplitude of each path and a target value of the initial phase of each path based on the target value of the distance of each path and the target value of the angle of arrival of each path.

4. The method according to claim 3, wherein the calculating a target value of a distance of each path and a target value of the angle of arrival of each path based on the target likelihood spectrum comprises:
    calculating an initial value of the distance of each path and an initial value of the angle of arrival of each path based on the target likelihood spectrum; and
    calculating the target value of the distance of each path and the target value of the angle of arrival of each path based on the initial value of the distance of each path and the initial value of the angle of arrival of each path by using an optimization algorithm.

5. The method according to claim 3, wherein the calculating a target value of a distance of each path and a target value of the angle of arrival of each path based on the target likelihood spectrum comprises:
  calculating an initial value of the distance of each path and an initial value of the angle of arrival of each path based on the target likelihood spectrum; and
  calculating the target value of the distance of each path and the target value of the angle of arrival of each path based on the target likelihood spectrum, the initial value of the distance of each path, and the initial value of the angle of arrival of each path by using a search algorithm.

6. The method according to claim 2, wherein the channel frequency response mathematical model is expressed as follows:

$$F(k, i) = \sum_{n=1}^{N} a_n e^{j\phi_n} e^{-j\frac{2\pi}{\lambda_i}d_n} e^{-j\frac{2\pi}{\lambda_i}kl\cos\theta_n},$$

wherein $F(k,i)$ represents the channel frequency response mathematical model, $n=1, 2, \ldots, N$ represents a number of a path, N represents a quantity of paths, $d_n$ represents a distance of an $n^{th}$ path, $\theta_n$ represents an angle of arrival of the $n^{th}$ path, $a_n$ represents an amplitude of the $n^{th}$ path, $\phi_n$ represents an initial phase of the $n^{th}$ path, $\lambda_i$ represents a wavelength corresponding to an $i^{th}$ subcarrier frequency $i=1, 2, \ldots, I$ represents a number of a subcarrier frequency, I represents a quantity of subcarrier frequencies, $k=1, 2, \ldots, K$ represents a number of an array element, K represents a quantity of array elements, and l represents an array element spacing.

7. The method according to claim 6, wherein a target likelihood spectrum of the uplink channel frequency response is expressed as follows:

$$\Theta(d, \theta) = \left\| \sum_{i=1}^{I} \sum_{k=1}^{K} h_{UL}(k, i) e^{j\frac{2\pi}{\lambda_{UL,i}}d} e^{j\frac{2\pi}{\lambda_{UL,i}}kl\cos\theta} \right\|_2^2,$$

wherein $\Theta(d,\theta)$ represents the target likelihood spectrum, $h_{UL}(k,i)$ represents the uplink channel frequency response, d represents a distance of a path, $\theta$ represents an angle of arrival of a path, $\lambda_{UL,i}$ represents a wavelength corresponding to an $i^{th}$ uplink subcarrier frequency, $i=1, 2, \ldots, I$ represents the number of a subcarrier frequency, I represents the quantity of subcarrier frequencies, $k=1, 2, \ldots, K$ represents the number of an array element, K represents the quantity of array elements, l represents the array element spacing, and $\| \|_2$ represents a Euclidean norm.

8. The method according to claim 2, wherein when the antenna array is a planar array, the channel frequency response mathematical model is expressed as follows:

$$F(k_H, k_V, i) = \sum_{n=1}^{N} a_n e^{j\phi_n} e^{-j\frac{2\pi}{\lambda_i}d_n} e^{-j\frac{2\pi}{\lambda_i}k_V l\cos\gamma_n} e^{-j\frac{2\pi}{\lambda_i}k_H l\cos\varphi_n \sin\gamma_n},$$

wherein $F(k_H,k_V,i)$ represents the channel frequency response mathematical model, $n=1, 2, \ldots, N$ represents a number of a path, N represents a quantity of paths, $d_n$ represents a distance of an $n^{th}$ path, $\theta_n$ represents an angle of arrival of the $n^{th}$ path, $a_n$ represents an amplitude of the $n^{th}$ path, $\phi_n$ represents an initial phase of the $n^{th}$ path, $\lambda_i$ represents a wavelength corresponding to an $i^{th}$ subcarrier frequency $i=1, 2, \ldots, I$ represents a number of a subcarrier frequency, I represents a quantity of subcarrier frequencies, $k=1, 2, \ldots, K$ represents a number of an array element, K represents a quantity of array elements, l represents an array element spacing, $k_H$ represents a quantity of rows of the antenna array, $k_V$ represents a quantity of columns of the antenna array, $\varphi_n$ represents a horizontal angle of the $n^{th}$ path, and $\gamma_n$ represents a pitch angle of the $n^{th}$ path.

9. The method according to claim 1, wherein when the antenna array is the dual-polarized antenna array, the uplink channel frequency response comprises a first polarization uplink channel frequency response and a second polarization uplink channel frequency response, wherein the model parameter comprises a first polarization model parameter and a second polarization model parameter, and wherein the model parameter conforms to the following expression:

$$\begin{cases} \{\text{model parameter}\} = \\ \underset{\{model\ parameter\}}{\arg\min} \ \|F_{UL}^+(k, i) - h_{UL}^+(k, i)\|_2^2 + \|F_{UL}^-(k, i) - h_{UL}^-(k, i)\|_2^2 \\ F_{UL}^+(k, i\,|\,\lambda, \text{model parameter}) = \\ \quad F(k, i\,|\,\lambda_{UL}, \text{first polarization model parameter}) \\ F_{UL}^-(k, i\,|\,\lambda, \text{model parameter}) = \\ \quad F(k, i\,|\,\lambda_{UL}, \text{second polarization model parameter}) \end{cases},$$

wherein argmin represents a variable when an objective function is solved to obtain a minimum value, i represents the number of a subcarrier frequency, k represents the number of an array element, $\lambda$ represents a wavelength corresponding to a subcarrier frequency, $\lambda_{UL}$ represents a wavelength corresponding to an uplink subcarrier frequency, $F_{UL}^+$ represents a first polarization uplink channel frequency response mathematical model, $F_{UL}^-$ represents a second polarization uplink channel frequency response mathematical model, F represents the channel frequency response mathematical model, $h_{UL}^+$ represents the first polarization uplink channel frequency response, $h_{UL}^-$ represents the second polarization uplink channel frequency response, and $\| \|_2$ represents a Euclidean norm.

10. The method according to claim 3, wherein when the antenna array is the dual-polarized antenna array, the uplink channel frequency response comprises a first polarization uplink channel frequency response and a second polarization uplink channel frequency response, and wherein the constructing a target likelihood spectrum of the uplink channel frequency response based on the uplink channel frequency response and each uplink subcarrier frequency comprises:
  constructing a first polarization likelihood spectrum of the uplink channel frequency response based on the first polarization uplink channel frequency response and each uplink subcarrier frequency; and
  constructing a second polarization likelihood spectrum of the uplink channel frequency response based on the second polarization uplink channel frequency response and each uplink subcarrier frequency, wherein a sum of the first polarization likelihood spectrum and the second polarization likelihood spectrum is the target likelihood spectrum.

11. The method according to claim 2, wherein when the antenna array is the dual-polarized antenna array, the amplitude of each path comprises an amplitude, corresponding to a first polarization direction, of each path and an amplitude, corresponding to a second polarization direction, of each path, wherein the initial phase of each path comprises an initial phase, corresponding to the first polarization direction, of each path and an initial phase, corresponding to the second polarization direction, of each path, wherein the downlink channel frequency response comprises a first polarization downlink channel frequency response and a second polarization downlink channel frequency response, and wherein the constructing a downlink channel frequency response based on the model parameter, the channel frequency response mathematical model, and each downlink subcarrier frequency comprises:

constructing the first polarization downlink channel frequency response based on the distance of each path, the angle of arrival of each path, the amplitude, corresponding to the first polarization direction, of each path, and the initial phase, corresponding to the first polarization direction, of each path in the model parameter, the channel frequency response mathematical model, and each downlink subcarrier frequency; and constructing the second polarization downlink channel frequency response based on the distance of each path, the angle of arrival of each path, the amplitude, corresponding to the second polarization direction, of each path, and the initial phase, corresponding to the second polarization direction, of each path in the model parameter, the channel frequency response mathematical model, and each downlink subcarrier frequency.

12. The method according to claim 11, wherein the beamforming weight comprises a first polarization weight and a second polarization weight, and wherein the calculating a beamforming weight for each downlink subcarrier frequency based on the downlink channel frequency response comprises:

calculating a beamforming weight, corresponding to the first polarization direction, for each downlink subcarrier frequency based on the first polarization downlink channel frequency response; and calculating a beamforming weight, corresponding to the second polarization direction, for each downlink subcarrier frequency based on the second polarization downlink channel frequency response.

13. The method according to claim 1, wherein the model parameter conforms to the following expression:

$$\begin{cases} \{\text{model parameter}\} = \underset{\{\text{model parameter}\}}{\arg\min} \ \|F_{UL}(k, i) - h_{UL}(k, i)\|_2^2 \\ F_{UL}(k, i | \lambda) = F(k, i | \lambda_{UL}) \end{cases},$$

wherein argmin represents a variable when an objective function is solved to obtain a minimum value, i represents the number of a subcarrier frequency, k represents the number of an array element, $\lambda$ represents a wavelength corresponding to a subcarrier frequency, $\lambda_{UL}$ represents a wavelength corresponding to an uplink subcarrier frequency, $F_{UL}$ represents an uplink channel frequency response mathematical model, F represents the channel frequency response mathematical model, $h_{UL}$ represents the uplink channel frequency response, and $\| \ \|_2$ represents a Euclidean norm.

14. An access network device, comprising at least one processor and a memory coupled to the at least one processor and storing programming instructions for execution by the at least one processor, wherein the programming instructions instruct the at least one processor to perform operations comprising:

calculating an uplink channel frequency response based on an uplink signal received from a terminal;

calculating a model parameter in a channel frequency response mathematical model based on the uplink channel frequency response and each uplink subcarrier frequency, wherein the model parameter has reciprocity on uplink and downlink subcarrier frequencies;

constructing a downlink channel frequency response based on the model parameter, the channel frequency response mathematical model, and each downlink subcarrier frequency;

calculating a beamforming weight for each downlink subcarrier frequency based on the downlink channel frequency response; and performing downlink beamforming on an antenna array based on the beamforming weight for each downlink subcarrier frequency, wherein the antenna array is a dual-polarized antenna array or a single-polarized antenna array, and wherein the antenna array is used by the access network device to communicate with the terminal.

15. The access network device according to claim 14, wherein the model parameter comprises a distance of each path, an angle of arrival of each path, an amplitude of each path, and an initial phase of each path.

16. The access network device according to claim 15, wherein the calculating a model parameter in a channel frequency response mathematical model based on the uplink channel frequency response and each uplink subcarrier frequency comprises:

constructing a target likelihood spectrum of the uplink channel frequency response based on the uplink channel frequency response and each uplink subcarrier frequency;

calculating a target value of the distance of each path and a target value of the angle of arrival of each path based on the target likelihood spectrum; and calculating a target value of the amplitude of each path and a target value of the initial phase of each path based on the target value of the distance of each path and the target value of the angle of arrival of each path.

17. The access network device according to claim 16, wherein the calculating a target value of a distance of each path and a target value of the angle of arrival of each path based on the target likelihood spectrum comprises:

calculating an initial value of the distance of each path and an initial value of the angle of arrival of each path based on the target likelihood spectrum; and calculating the target value of the distance of each path and the target value of the angle of arrival of each path based on the initial value of the distance of each path and the initial value of the angle of arrival of each path by using an optimization algorithm.

18. The access network device according to claim 16, wherein the calculating a target value of a distance of each path and a target value of the angle of arrival of each path based on the target likelihood spectrum comprises:

calculating an initial value of the distance of each path and an initial value of the angle of arrival of each path based on the target likelihood spectrum; and calculating the target value of the distance of each path and the target value of the angle of arrival of each path based on the target likelihood spectrum, the initial value of the distance of each path, and the initial value of the angle of arrival of each path by using a search algorithm.

19. The access network device according to claim 15, wherein the channel frequency response mathematical model is expressed as follows:

$$F(k, i) = \sum_{n=1}^{N} a_n e^{j\phi_n} e^{-j\frac{2\pi}{\lambda_i}d_n} e^{-j\frac{2\pi}{\lambda_i}kl\cos\theta_n}$$

wherein $F(k,i)$ represents the channel frequency response mathematical model, $n=1, 2, \ldots, N$ represents a number of a path, $N$ represents a quantity of paths, $d_n$ represents a distance of an $n^{th}$ path, $\theta_n$ represents an angle of arrival of the $n^{th}$ path, $a_n$ represents an amplitude of the $n^{th}$ path, $\phi_n$ represents an initial phase of the $n^{th}$ path, $\lambda_i$ represents a wavelength corresponding to an $i^{th}$ subcarrier frequency, $i=1, 2, \ldots, I$ represents a number of a subcarrier frequency, $I$ represents a quantity of subcarrier frequencies, $k=1, 2, \ldots, K$ represents a number of an array element, $K$ represents a quantity of array elements, and $l$ represents an array element spacing.

20. The access network device according to claim 19, wherein a target likelihood spectrum of the uplink channel frequency response is expressed as follows:

$$\Theta(d, \theta) = \left\| \sum_{i=1}^{I} \sum_{k=1}^{K} h_{UL}(k, i) e^{j\frac{2\pi}{\lambda_{UL,i}}d} e^{j\frac{2\pi}{\lambda_{UL,i}}kl\cos\theta} \right\|_2^2$$

wherein $\Theta(d,\theta)$ represents the target likelihood spectrum, $h_{UL}(k,i)$ represents the uplink channel frequency response, $d$ represents a distance of a path, $\theta$ represents an angle of arrival of a path, $\lambda_{UL,i}$ represents a wavelength corresponding to an $i^{th}$ uplink subcarrier frequency, $i=1, 2, \ldots, I$ represents the number of a subcarrier frequency, $I$ represents the quantity of subcarrier frequencies, $k=1, 2, \ldots, K$ represents the number of an array element, $K$ represents the quantity of array elements, $l$ represents the array element spacing, and $\|\ \|_2$ represents a Euclidean norm.

21. The access network device according to claim 15, wherein when the antenna array is a planar array, the channel frequency response mathematical model is expressed as follows:

$$F(k_H, k_V, i) = \sum_{n=1}^{N} a_n e^{j\phi_n} e^{-j\frac{2\pi}{\lambda_i}d_n} e^{-j\frac{2\pi}{\lambda_i}k_V l\cos\gamma_n} e^{-j\frac{2\pi}{\lambda_i}k_H l\cos\varphi_n \sin\gamma_n},$$

wherein $F(k_H, k_V, i)$ represents the channel frequency response mathematical model, $n=1, 2, \ldots, N$ represents a number of a path, $N$ represents a quantity of paths, $d_n$ represents a distance of an $n^{th}$ path, $\theta_n$ represents an angle of arrival of the $n^{th}$ path, $a_n$ represents an amplitude of the $n^{th}$ path, $\phi_n$ represents an initial phase of the $n^{th}$ path, $\lambda_i$ represents a wavelength corresponding to an $i^{th}$ subcarrier frequency $i=1, 2, \ldots, I$ represents a number of a subcarrier frequency, $I$ represents a quantity of subcarrier frequencies $k=1, 2, \ldots, K$ represents a number of an array element, $K$ represents a quantity of array elements, $l$ represents an array element spacing, $k_H$ represents a quantity of rows of the antenna array, $k_V$ represents a quantity of columns of the antenna array, $\varphi_n$ represents a horizontal angle of the $n^{th}$ path, and $\gamma_n$ represents a pitch angle of the $n^{th}$ path.

22. The access network device according to claim 14, wherein when the antenna array is the dual-polarized antenna array, the uplink channel frequency response comprises a first polarization uplink channel frequency response and a second polarization uplink channel frequency response, wherein the model parameter comprises a first polarization model parameter and a second polarization model parameter, and wherein the model parameter conforms to the following expression:

$$\begin{cases} \{\text{model parameter}\} = \\ \quad \underset{\{model\ parameter\}}{\arg\min}\ \|F_{UL}^+(k, i) - h_{UL}^+(k, i)\|_2^2 + \|F_{UL}^-(k, i) - h_{UL}^-(k, i)\|_2^2 \\ \quad F_{UL}^+(k, i\,|\,\lambda, \text{model parameter}) = \\ \quad F(k, i\,|\,\lambda_{UL}, \text{first polarization model parameter}) \\ \quad F_{UL}^-(k, i\,|\,\lambda, \text{model parameter}) = \\ \quad F(k, i\,|\,\lambda_{UL}, \text{second polarization model parameter}) \end{cases},$$

wherein argmin represents a variable when an objective function is solved to obtain a minimum value, $i$ represents the number of a subcarrier frequency, $k$ represents the number of an array element, $\lambda$ represents a wavelength corresponding to a subcarrier frequency, $\lambda_{UL}$ represents a wavelength corresponding to an uplink subcarrier frequency, $F_{UL}^+$ represents a first polarization uplink channel frequency response mathematical model, $F_{UL}^-$ represents a second polarization uplink channel frequency response mathematical model, $F$ represents the channel frequency response mathematical model, $h_{UL}^+$ represents the first polarization uplink channel frequency response, $h_{UL}^-$ represents the second polarization uplink channel frequency response, and $\|\ \|_2$ represents a Euclidean norm.

23. The access network device according to claim 16, wherein when the antenna array is the dual-polarized antenna array, the uplink channel frequency response comprises a first polarization uplink channel frequency response and a second polarization uplink channel frequency response, and wherein the constructing a target likelihood spectrum of the uplink channel frequency response based on the uplink channel frequency response and each uplink subcarrier frequency, the at least one processor being configured to:
constructing a first polarization likelihood spectrum of the uplink channel frequency response based on the first polarization uplink channel frequency response and each uplink subcarrier frequency; and
constructing a second polarization likelihood spectrum of the uplink channel frequency response based on the second polarization uplink channel frequency response and each uplink subcarrier frequency, wherein a sum of the first polarization likelihood spectrum and the second polarization likelihood spectrum is the target likelihood spectrum.

24. The access network device according to claim 15, wherein when the antenna array is the dual-polarized antenna array, the amplitude of each path comprises an amplitude, corresponding to a first polarization direction, of each path and an amplitude, corresponding to a second polarization direction, of each path, wherein the initial phase of each path comprises an initial phase, corresponding to the first polarization direction, of each path and an initial phase, corresponding to the second polarization direction, of each path, wherein the downlink channel frequency response comprises a first polarization downlink channel frequency response and a second polarization downlink channel frequency response, and wherein the constructing a downlink channel frequency response based on the model parameter, the channel frequency response mathematical model, and each downlink subcarrier frequency comprises:

constructing the first polarization downlink channel frequency response based on the distance of each path, the angle of arrival of each path, the amplitude, corresponding to the first polarization direction, of each path, and the initial phase, corresponding to the first polarization direction, of each path in the model parameter, the channel frequency response mathematical model, and each downlink subcarrier frequency; and constructing the second polarization downlink channel frequency response based on the distance of each path, the angle of arrival of each path, the amplitude, corresponding to the second polarization direction, of each path, and the initial phase, corresponding to the second polarization direction, of each path in the model parameter, the channel frequency response mathematical model, and each downlink subcarrier frequency.

25. The access network device according to claim 24, wherein the beamforming weight comprises a first polarization weight and a second polarization weight, and wherein the calculating a beamforming weight for each downlink subcarrier frequency based on the downlink channel frequency response comprises:

calculating a beamforming weight, corresponding to the first polarization direction, for each downlink subcarrier frequency based on the first polarization downlink channel frequency response; and calculating a beamforming weight, corresponding to the second polarization direction, for each downlink subcarrier frequency based on the second polarization downlink channel frequency response.

26. The access network device according to claim 14, wherein the model parameter conforms to the following expression:

$$\begin{cases} \{\text{model parameter}\} = \underset{\{model\ parameter\}}{\arg\min} \quad \|F_{UL}(k, i) - h_{UL}(k, i)\|_2^2 \\ F_{UL}(k, i|\lambda) = F(k, i|\lambda_{UL}) \end{cases},$$

wherein argmin represents a variable when an objective function is solved to obtain a minimum value, i represents the number of a subcarrier frequency, k represents the number of an array element, $\lambda$ represents a wavelength corresponding to a subcarrier frequency, $\lambda_{UL}$ represents a wavelength corresponding to an uplink subcarrier frequency, $F_{UL}$ represents an uplink channel frequency response mathematical model, F represents the channel frequency response mathematical model, $h_{UL}$ represents the uplink channel frequency response, and $\|\ \|_2$ represents a Euclidean norm.

27. A non-transitory computer-readable storage medium comprising instructions which, when executed by at least one processor of an access network device, cause the at least one processor to perform operations comprising:

calculating an uplink channel frequency response based on an uplink signal received from a terminal;

calculating a model parameter in a channel frequency response mathematical model based on the uplink channel frequency response and each uplink subcarrier frequency, wherein the model parameter has reciprocity on uplink and downlink subcarrier frequencies;

constructing a downlink channel frequency response based on the model parameter, the channel frequency response mathematical model, and each downlink subcarrier frequency;

calculating a beamforming weight for each downlink subcarrier frequency based on the downlink channel frequency response; and performing downlink beamforming on an antenna array based on the beamforming weight for each downlink subcarrier frequency, wherein the antenna array is a dual-polarized antenna array or a single-polarized antenna array, and wherein the antenna array is used by the access network device to communicate with the terminal.

* * * * *

UNITED STATES PATENT AND TRADEMARK OFFICE
CERTIFICATE OF CORRECTION

| | | |
|---|---|---|
| PATENT NO. | : 11,265,054 B2 | Page 1 of 1 |
| APPLICATION NO. | : 16/742366 | |
| DATED | : March 1, 2022 | |
| INVENTOR(S) | : Zhimeng Zhong et al. | |

It is certified that error appears in the above-identified patent and that said Letters Patent is hereby corrected as shown below:

In the Claims

In Column 37 Line 29 (approx.), In Claim 6, delete "frequency" and insert --frequency,--.

In Column 38 Line 5, In Claim 8, delete "frequency" and insert --frequency,--.

In Column 41 Line 57 (approx.), In Claim 21, after $$"F(k_H, k_V, i) = \sum_{n=1}^{N} a_n e^{j\phi_n} e^{-j\frac{2\pi}{\lambda_i}d_n} e^{-j\frac{2\pi}{\lambda_i}k_V l\cos\gamma_n} e^{-j\frac{2\pi}{\lambda_i}k_H l\cos\varphi_n \sin\gamma_n}"$$

delete ",".

In Column 42 Line 1, In Claim 21, delete "frequency" and insert --frequency,--.

In Column 42 Line 3, In Claim 21, delete "frequencies" and insert --frequencies,--.

In Column 42 Line 25 (approx.), In Claim 22, after $$"\begin{cases} \{\text{model parameter}\} = \\ \underset{\{\text{model parameter}\}}{\arg\min} \ \|F_{UL}^+(k, i) - h_{UL}^+(k, i)\|_2^2 + \|F_{UL}^-(k, i) - h_{UL}^-(k, i)\|_2^2 \\ F_{UL}^+(k, i \mid \lambda, \text{model parameter}) = \\ F(k, i \mid \lambda_{UL}, \text{first polarization model parameter}) \\ F_{UL}^-(k, i \mid \lambda, \text{model parameter}) = \\ F(k, i \mid \lambda_{UL}, \text{second polarization model parameter}) \end{cases}"$$

delete ",".

Signed and Sealed this
Seventh Day of June, 2022

*Katherine Kelly Vidal*

Katherine Kelly Vidal
*Director of the United States Patent and Trademark Office*